(12) United States Patent
Kondo et al.

(10) Patent No.: US 7,634,111 B2
(45) Date of Patent: Dec. 15, 2009

(54) STORAGE DEVICE, SIGNAL PROCESSOR, IMAGE SIGNAL PROCESSOR, AND THEIR METHODS

(75) Inventors: Tetsujiro Kondo, Tokyo (JP); Junichi Ishibashi, Saitama (JP); Kazushi Yoshikawa, Kanagawa (JP); Seiji Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 590 days.

(21) Appl. No.: 10/490,855

(22) PCT Filed: Jul. 30, 2003

(86) PCT No.: PCT/JP03/09638

§ 371 (c)(1),
(2), (4) Date: Aug. 26, 2004

(87) PCT Pub. No.: WO2004/012451

PCT Pub. Date: Feb. 5, 2004

(65) Prior Publication Data

US 2005/0008195 A1 Jan. 13, 2005

(30) Foreign Application Priority Data

Jul. 30, 2002 (JP) .............................. 2002-222030

(51) Int. Cl.
*G06K 9/00* (2006.01)
*G06K 9/36* (2006.01)

(52) U.S. Cl. ...................................... 382/107; 382/236

(58) Field of Classification Search ................. 382/107, 382/236
See application file for complete search history.

(56) References Cited

U.S. PATENT DOCUMENTS 5,576,772 A * 11/1996 Kondo ......................... 348/699

(Continued)

FOREIGN PATENT DOCUMENTS

EP 0 420 657 A2 4/1991

(Continued)

OTHER PUBLICATIONS

Skodras, The JPEG 2000 still image compression standard, Sep. 2001, Signal Processing Magazine, IEEE. vol. 18, Issue 5, pp. 36-58.*

(Continued)

*Primary Examiner*—Vikkram Bali
*Assistant Examiner*—Max Shikhman
(74) *Attorney, Agent, or Firm*—Oblon, Spivak, McClelland, Maier & Neustadt, L.L.P.

(57) ABSTRACT

An image processing apparatus and an image processing method capable of performing matching processing with a small amount of calculation and highly accurately detecting a motion vector, etc., provided with a first feature extraction portion 13 for extracting a feature and spatial coordinates of a focused pixel from information of a current frame; a second feature extraction portion 14 for extracting from information of a reference frame a feature, a focused pixel, spatial coordinates of the focused pixel, spatial coordinates of vicinity region of the focused pixel, and distance information of the focused pixel with respect to the spatial coordinates; a database creation portion 15 for creating a database indicating relative relationship of the feature, the focused pixel, the spatial coordinates in the vicinity of the focused pixel and the distance information of the focused pixel with respect to the spatial coordinates; and a motion vector detection portion 16 for obtaining spatial coordinates of a shifted position by calculating by searching distance information linked to the feature from the database based on the feature extracted by the first feature extraction portion 13.

15 Claims, 23 Drawing Sheets

U.S. PATENT DOCUMENTS

| | | | |
|---|---|---|---|
| 5,610,658 A * | 3/1997 | Uchida et al. | 348/416.1 |
| 5,612,751 A * | 3/1997 | Kondo | 348/699 |
| 5,940,539 A * | 8/1999 | Kondo et al. | 382/236 |
| 6,148,108 A * | 11/2000 | Nishikawa | 382/236 |
| 6,266,371 B1 * | 7/2001 | Kondo | 375/240.16 |
| 6,987,884 B2 * | 1/2006 | Kondo et al. | 382/190 |

FOREIGN PATENT DOCUMENTS

| | | |
|---|---|---|
| JP | 7-87499 | 3/1995 |
| JP | 10-191344 | 7/1998 |
| JP | 2000-197061 | 7/2000 |
| WO | WO 01/01692 A1 | 1/2001 |

OTHER PUBLICATIONS

Sakai, Precise Estimation of Motion Vectors and its Application to MPEG Video Retrieval, 1999, IEEE, p. 279-283.*

U.S. Appl. No. 10/677,537, filed Oct. 3, 2003, Kondo et al.

U.S. Appl. No. 10/490,208, filed Mar. 29, 2004, Kondo et al.

Aggarwal J.K. et al., "On the Computation of Motion From Sequences of Images—A Review," Proceedings of the IEEE, New York, US, vol. 76, No. 8, Aug. 1, 1988, pp. 917-935, XP000111966.

Aggarwal J.K. et al., "Correspondence Processes in Dynamic Scene Analysis" Proceeding of the IEEE, vol. 69, May 1981, pp. 562-572, XP002471366.

* cited by examiner

| PIXEL VALUE A | PIXEL VALUE B | PIXEL VALUE C |

FIG. 9

| LINK DATA |
|---|

=

| SPATIAL COORDINATES | RELIABILITY INFORMATION |
|---|---|

FIG. 10

| (x0、y0) | (x0、y0) | (x0、y0) |
|---|---|---|
| (x0、y0) | (x0、y0) | (x0、y0) |
| (x0、y0) | (x0、y0) | (x0、y0) |

FIG. 11

| 0.3 | 0.5 | 0.3 |
|---|---|---|
| 0.5 | 1 | 0.5 |
| 0.3 | 0.5 | 0.3 | n + 1

<WHEN USING SPATIAL COORDINATES INFORMATION FOR RELIABILITY CHECKING>

STORAGE DEVICE, SIGNAL PROCESSOR, IMAGE SIGNAL PROCESSOR, AND THEIR METHODS

TECHNICAL FIELD

The present invention relates to a memory device, a signal processing apparatus, an image signal processing apparatus and signal processing methods applicable to processing requiring matching, such as a motion detection device and an object search device, etc. used, for example, in a motion image compression device, etc.

BACKGOUND ART

A matching processing of a signal, particularly, a matching processing of an image signal has a problem of generally causing a large amount of calculation. A motion vector detection by block matching as described below is an example of using the matching processing.

Namely, in an image processing apparatus, motion detection for obtaining a motion vector indicating a motion of an image is one major technique for effectively performing the motion image compression. There are some proposed methods of obtaining the motion vector, but one major method is a method called block a matching algorithm.

FIG. 1 is a block diagram showing an example of a configuration of a motion detection device in an image signal processing apparatus of the related art, wherein the block matching algorithm is applied.

The motion detection device 1 comprises frame memories 2 and 3 and a motion vector detection portion 4.

In the motion detection device 1, when an image signal is input from an input terminal TIN, an information of one frame is stored in the frame memory 2.

When an information of the next image is input, the previous (previously input) information in the frame memory 2 is stored in the frame memory 3, and the currently (this time) input information is stored in the frame memory 2.

Namely, the information of a current frame Fc is stored in the frame memory 2, and an information of a reference frame Fr is stored in the frame memory 3.

Next, an information of the current frame Fc and the reference frame Fr is sent to the vector detection portion 4 and divided to blocks in the motion vector detection portion 4 where a motion vector (Vx, Vy) is detected and output from a terminal TOUT.

FIG. 2 is a view for explaining an outline of block matching algorithm. Below, the outline of algorithm will be explained with reference to FIG. 2.

In this algorithm, a motion vector of a focused pixel Fc (x, y) in the current frame Fc is obtained by calculating a differential absolute value sum of corresponding pixels in pixels in a reference block range (L×L) having the focused pixel Fc (x, y) at its center and pixels in the same block range as the above block range (L×L) in a search area SR in the reference frame Fr.

The above calculation is repeated while moving the block range extracted in the search area SR by one pixel, and a differential vector of the center position of a block having the smallest differential absolute value sum in all blocks and the focused pixel position is regarded as the solution (motion vector).

Next, a processing procedure of detecting a motion vector of the pixel Fc (x, y) in the current frame Fc will be explained in detail with reference to FIG. 3.

Step ST1:
In the step ST1, a search area SR using as a reference the same position in the reference frame as the position (x, y) of the focused pixel is determined after starting processing ST0.

Step ST2:
In the step ST2, the maximum value of a calculation formula is substituted to initialize a variable "min" storing the minimum value of a calculation result. When assuming that one pixel is 8 bits and the number of pixels in a block is 16, $2^8 \times 16 = 4096$ is assigned to the variable "min".

Step ST3:
In the step ST3, a counter variable "n" for counting blocks in a search area SR is initialized to be "1".

Step ST4:
In the step ST4, a variable "sum" for being substituted a calculation result is initialized to be "0".

Step ST5:
In the step ST5, assuming that a range of a reference block is L×L, a pixel in a certain block in the current frame is Fc (i, j), and a pixel in the k-th block in the search area SR of the reference frame Fr is Frk (i, j), calculation of a differential absolute value sum of corresponding pixels, that is, the formula 1 below is performed and the calculation result is substituted for "sum".

$$\sum_{i=1}^{L}\sum_{j=1}^{L} = |Fc(i, j) - Frk(i, j)| \qquad (1)$$

Step ST6
In the step ST6, the relationship of large and small is distinguished between the calculated differential absolute value sum "sum" and the minimum value "min" of the differential absolute value sum. When the calculated differential absolute value sum "sum" is smaller, the procedure proceeds to a step ST7, while when it is larger (including being equal), the calculation result is not the minimum value, so that the step ST7 is skipped and the procedure proceeds to a step ST8.

Step ST7:
In the step ST7, the calculation result "sum" is updated by the minimum value "min", and a counter value "n" of the block as a motion vector number is set.

Step ST8:
In the step ST8, if the block counter value "n" is the total number of blocks in the search area SR, that is, the final block comes, it means the finish, so the procedure proceeds to a step ST10, while if it is not the final block, the procedure proceeds to a step ST9.

Step ST9:
In the step ST9, the block counter value "n" is incremented to "n+1", and the procedure proceeds to the step ST4 to repeat the calculation.

Step ST10:
In the step ST10, a motion vector is obtained from the center pixel and (x, y) of a block having a number stored in a motion number and output the same.

Since the block matching algorithm explained above repeats the calculation of the formula (1), there is a disadvantage that an amount of the calculation becomes enormous and most of the time of image compression processing, such as MPEG, is spent for that.

DISCLOSURE OF THE INVENTION

An object of the present invention is to provide a memory device, a signal processing apparatus, an image processing apparatus and signal processing methods capable of performing matching processing, etc. only with a small amount of calculation and accurately detecting a motion vector, etc.

To attain the above object, a first aspect of the present invention is a memory device storing information on first image data, comprising an input means for receiving a first feature value indicating a first feature based on a focused pixel value in a second image data which is different from the first image data; and a memory means for storing a second value feature indicating positional information of a pixel value in the first image data at a plurality of positions corresponding to a third feature value indicating the first feature based on the pixel value in the first image data and a feature value in vicinity of the third feature value; wherein the second feature value as the second feature of the first image data is output from a position corresponding to the first feature value of the memory means.

A second aspect of the present invention is a memory device for storing information, comprising an input/output means for receiving or outputting the information; and a storage portion for storing the information; wherein the storage portion at least stores a positional information of focused data in a predetermined signal at a plurality of positions specified by a plurality of addresses corresponding to a feature of the focused data in the predetermined signal and value in the vicinity of the feature.

Preferably, the storage portion further stores a reliability indicating assurance that the focused data takes a value of the feature or the vicinity of the feature.

A third aspect of the present invention is a memory device, comprising an input means for receiving a first feature indicating a feature of a focused pixel in image data and coordinates of the focused pixel; and a storage means for storing coordinates of the focused pixel by making it correspond to the first feature; wherein the storage means further stores coordinates of the focused pixel by making it correspond to a second feature indicating a feature of a pixel being different from the first feature.

Preferably, the storage means stores coordinates of the focused pixel at an address based on the first or second feature.

Also, the first feature is a pattern of value of pixel in the vicinity of the focused pixel.

Also, the memory device is a semiconductor device.

Preferably, the storage means further stores a reliability indicating assurance that the focused pixel takes the first feature or the second feature.

Preferably, the storage means further stores a reliability indicating assurance of storing coordinates of the focused pixel at an address based on the first feature or an address based on the second feature.

A fourth aspect of the present invention is a signal processing apparatus for performing matching processing by using a first signal including a plurality of first data and a second signal including a plurality of second data, comprising a first feature extraction means for extracting a feature as focused data being data at a focused position; and a storage means for storing positional information of the second data at positions specified by addresses corresponding to the respective features in the second data; wherein the storage means stores positional information of the second data at positions specified by addresses corresponding to a plurality of features; and the positional information of the second data corresponding to the focused data is obtained by reading the positional information to the second data stored in the storage means at an address corresponding to the feature of the focused data.

Preferably, the storage means further stores a reliability indicating assurance that the second data takes the feature corresponding to a stored address as a feature of the second data.

Preferably, the storage means further stores a reliability indicating assurance of storing positional information of the second data respectively to the addresses.

Preferably, the reliability is a reliability between a plurality of features.

Also, the reliability is a reliability based on a spatial distance.

A fifth aspect of the present invention is an image signal processing apparatus for detecting a motion vector by using a first image signal including a plurality of first data and a second image signal including a plurality of second data, comprising a first feature extraction means for extracting a feature as focused data being data at a focused position in the first image signal; a storage means for storing positional information of the second data at positions specified by a plurality of addresses corresponding to the respective features of the second data and value in the vicinity of the feature; and a motion vector calculation means for obtaining the positional information of the second data corresponding to the focused data by reading positional information to the second data stored in the storage means at an address corresponding to the feature of the focused data, and calculating a motion vector of the focused data by using the positional information of the focused data and the positional information of the obtained second data.

A sixth aspect of the present invention is a signal processing device for performing matching processing by using a first signal including a plurality of first data and a second signal including a plurality of second data, comprising a first feature extraction means for extracting a feature as focused data being data at a focused position; and a storage means for storing positional information of the second data at positions specified by addresses corresponding to the respective features in the second data; wherein the storage means stores positional information of the second data at positions specified by addresses corresponding to a plurality of features; and the positional information of the second data corresponding to the focused data is obtained by reading the positional information to the second data stored in the storage means at a plurality of addresses corresponding to the feature of the focused data and value in the vicinity of the feature.

A seventh aspect of the present invention is an image signal processing device for detecting a motion vector by using a first image signal including a plurality of first data and a second image signal including a plurality of second data, comprising a first feature extraction means for extracting a feature as focused data being data at a focused position in the first image signal; a storage means for storing positional information of the second data at positions specified by a plurality of addresses corresponding to the respective features of the second data and value in the vicinity of the feature; and a motion vector calculation means for obtaining the positional information of the second data corresponding to the focused data by reading positional information to the second data stored in the storage means at a plurality of addresses corresponding to the feature of the focused data and value in the vicinity of the feature, and calculating a motion vector of the focused data by using the positional information of the focused data and the positional information of the obtained second data.

Preferably, the motion vector calculation means obtains a motion vector based on reliability information in accordance with a spatial distance of an image when obtaining the positional information of the second data.

Preferably, the motion vector calculation means obtains a motion vector based on reliability information in accordance with a feature when obtaining the positional information of the second data.

Preferably, the motion vector calculation means obtains a motion vector based on a reliability information put together with a reliability information in accordance with a feature and a reliability information based on a spatial distance of an image when obtaining the positional information of the second data.

An eighth aspect of the present invention is a signal processing method for performing matching processing by using a first signal including a plurality of first data and a second signal including a plurality of second data, comprising a first step for extracting a feature as focused data being data of a focused position in the first signal; and a second step for storing positional information of the second data at positions specified by addresses corresponding to the respective features of the second data; wherein the second step stores the positional information of the second data at positions specified by addresses corresponding to a plurality of features; and the positional information of the second data corresponding to the focused data is obtained by reading positional information to the stored second data.

A ninth aspect of the present invention is an image signal processing method for detecting a motion vector by using a first image signal including a plurality of first data and a second image signal including a plurality of second data, comprising a first step for extracting a feature as focused data being data at a focused position in the first image signal; and a second step for storing positional information of the second data at positions specified by addresses corresponding to the respective features of the second data and value in the vicinity of the feature; a third step for obtaining the positional information of the second data corresponding to the focused data by reading the positional information to the stored second data at an address corresponding to the feature of the focused data, and calculating a motion vector of the focused data by using the positional information of the focused data and obtained the positional information of the second data.

A tenth aspect of the present invention is a signal processing method for performing matching processing by using a first signal including a plurality of first data and a second signal including a plurality of second data, comprising a first step for extracting a feature as focused data being data at a focused position in the first signal; and a second step for storing positional information of the second data at positions specified at addresses corresponding to the respective features of the second data; wherein the second step stores the positional information of the second data at positions specified by addresses corresponding to a plurality of features; and the positional information of the second data corresponding to the focused data is obtained by reading the positional information to the stored second data at a plurality of addresses corresponding to the feature of the focused data and value in vicinity of the feature.

An eleventh aspect of the present invention is an image signal processing method for detecting a motion vector by using a first image signal including a plurality of first data and a second image signal including a plurality of second data, comprising a first step for extracting a feature as focused data being data of a focused position in the first image signal; a second step for storing positional information of the second data at positions specified by a plurality of addresses corresponding to the respective features of the second data and value in the vicinity of the feature; and a third step for obtaining the positional information of the second data corresponding to the focused data by reading the positional information to the second data stored in the storage means at a plurality of addresses corresponding to the feature of the focused data and value in the vicinity of the feature, and calculating a motion vector of the focused data by using the positional information of the focused data and the positional information of the obtained second data.

BRIEF DESCRIPTION OF DRAWINGS

FIG. 9 is a view showing an example of a structure of data to be stored in a database according to the present embodiment.

FIG. 10 is a view showing spatial coordinates in link data expressed two dimensionally.

FIG. 11 is a view showing an example of reliability in link data two dimensionally.

BEST MODE FOR CARRYING OUT THE INVENTION

Below, preferred embodiments of the present invention will be explained with reference to the attached drawings.

Figure 1:
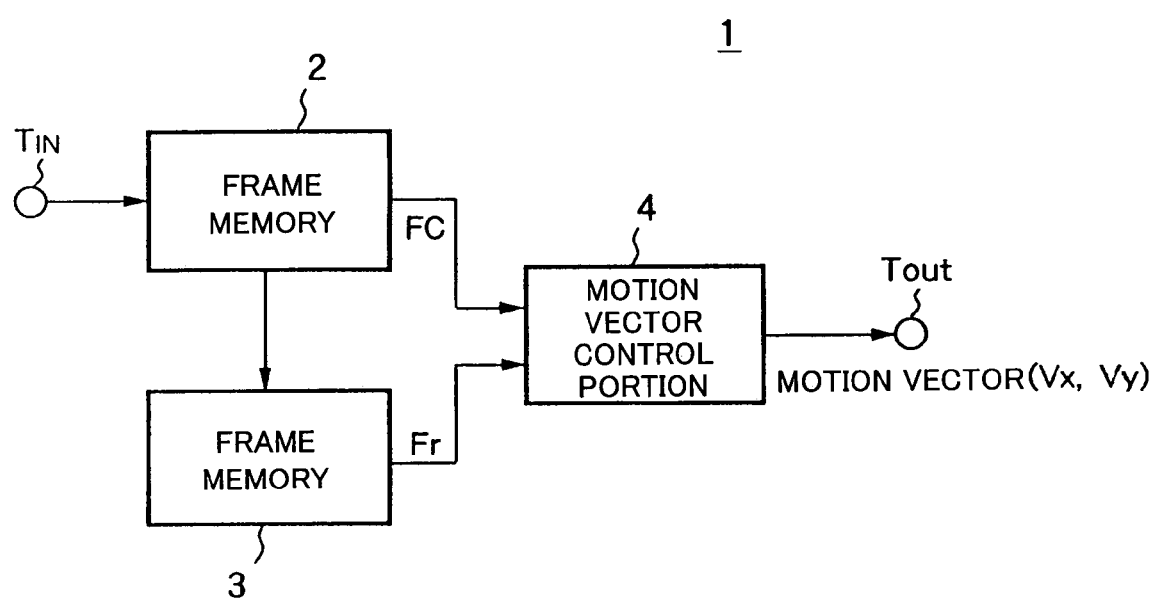
FIG. 1 is a block diagram showing an example of a configuration of a motion detection device of the related art wherein block matching algorithm is applied.
Figure 2:
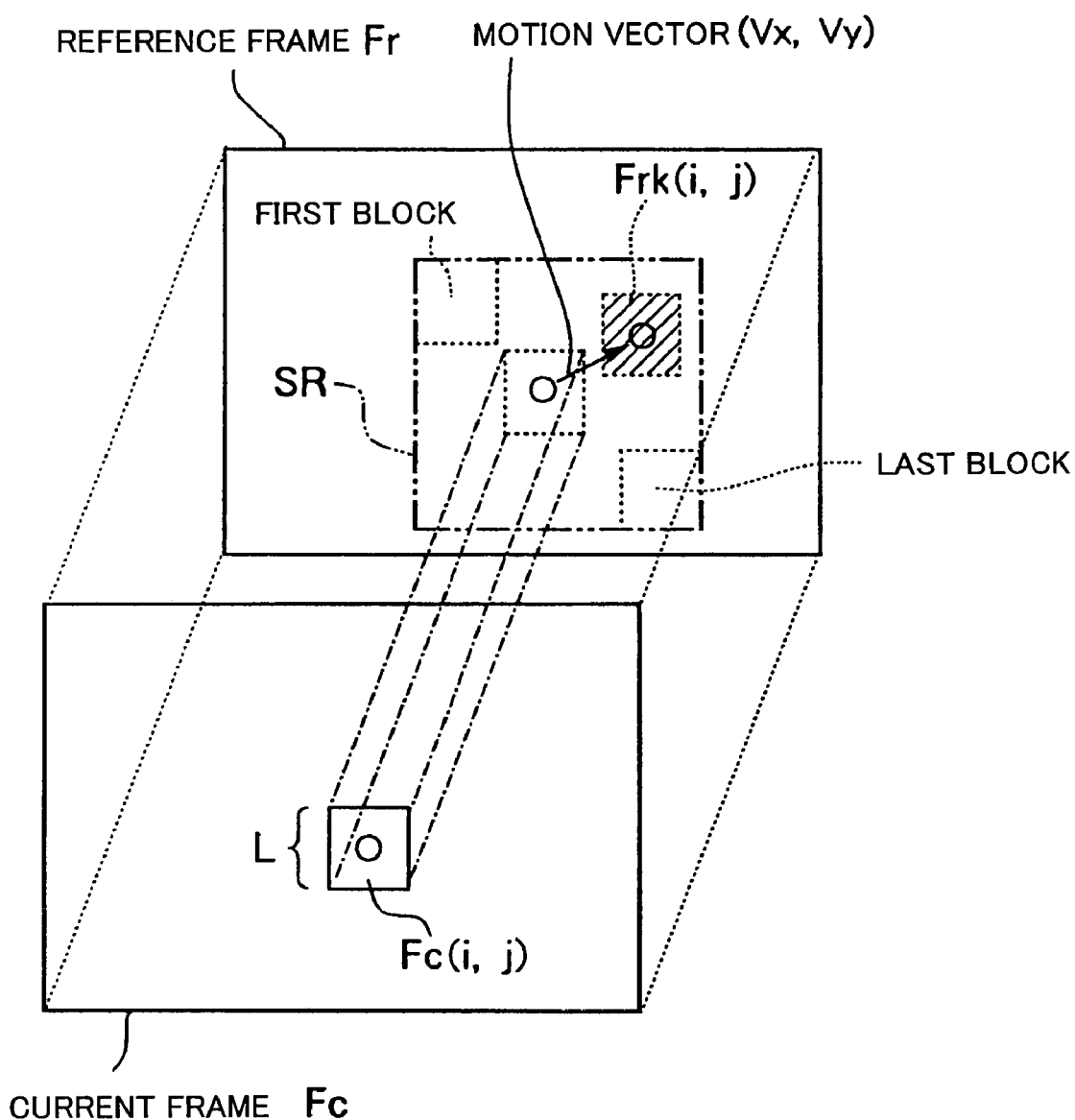
FIG. 2 is a view for explaining an outline of block matching algorithm.
Figure 3:
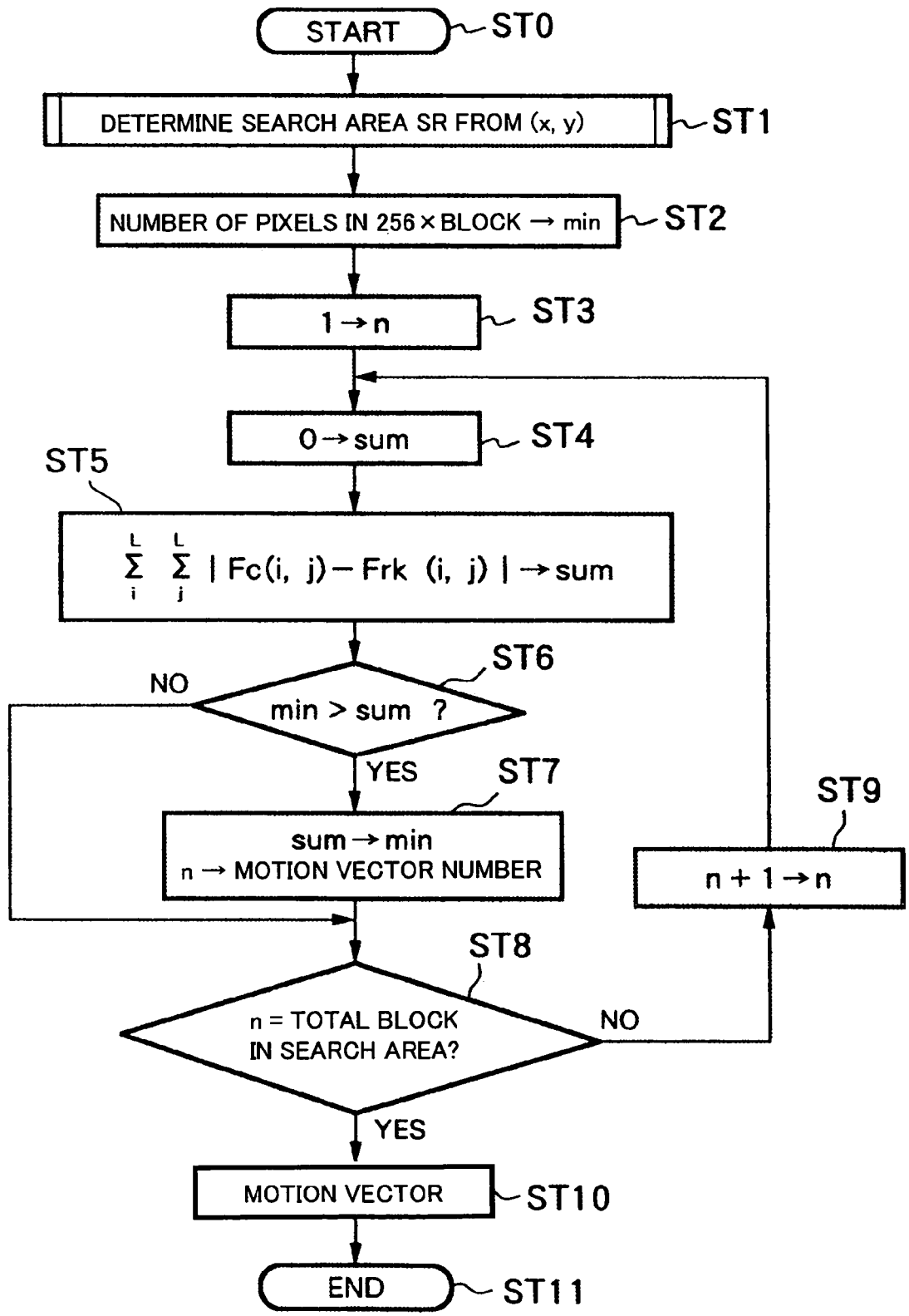
FIG. 3 is a flowchart for explaining a processing procedure of detecting a motion vector of a pixel Fc (x, y) in a current frame FC.
Figure 4:
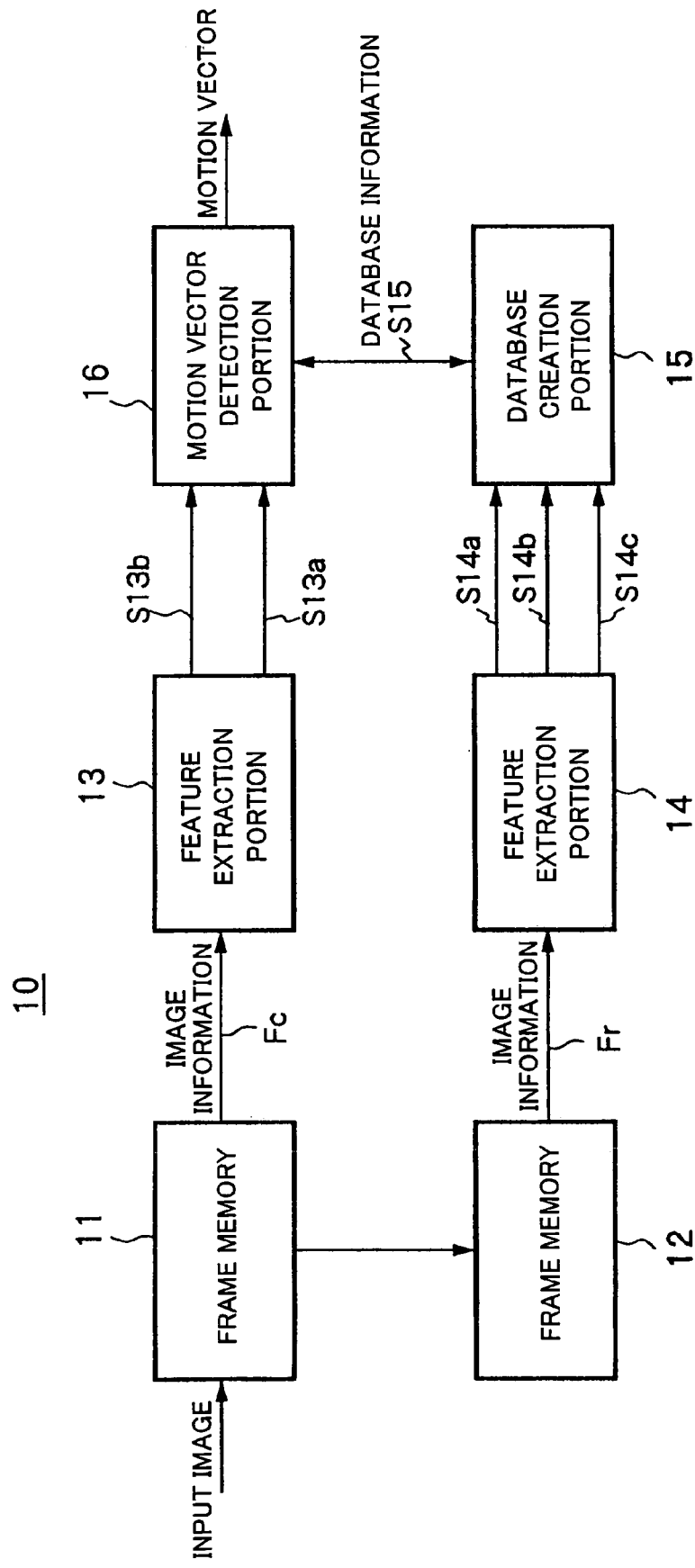
FIG. 4 is a block diagram showing an embodiment of a motion detection device as a key part of an image processing apparatus according to the present invention.

FIG. 4 is a block diagram showing an embodiment of a motion detection device as a key part of an image processing apparatus according to the present invention.

The motion detection device makes it possible to accurately estimate a motion vector with a small amount of calculation by creating a database indicating a correspondence relationship of a feature of a pixel and spatial coordinates of the pixel and detecting a motion vector based on data of the database. The database (memory) is for storing spatial coordinates, etc. of each pixel by using a feature of a pixel as an address. Alternately, spatial coordinates, etc. of a pixel may be linked by using a feature as an index.

By using a database (memory) using a feature as an address, the matching processing can be made easy. An outline thereof will be explained below.

This method makes it possible to accurately estimate a motion vector with a small amount of calculation by using a motion detection memory (hereinafter, referred to as an ME memory) for storing position information by using a feature as an address and performing the matching processing by using, for example, a surrounding pixel value as a feature.

The configuration and function of an ME memory wherein the feature address system is applied will be explained with reference to FIG. 5.

Figure 5:
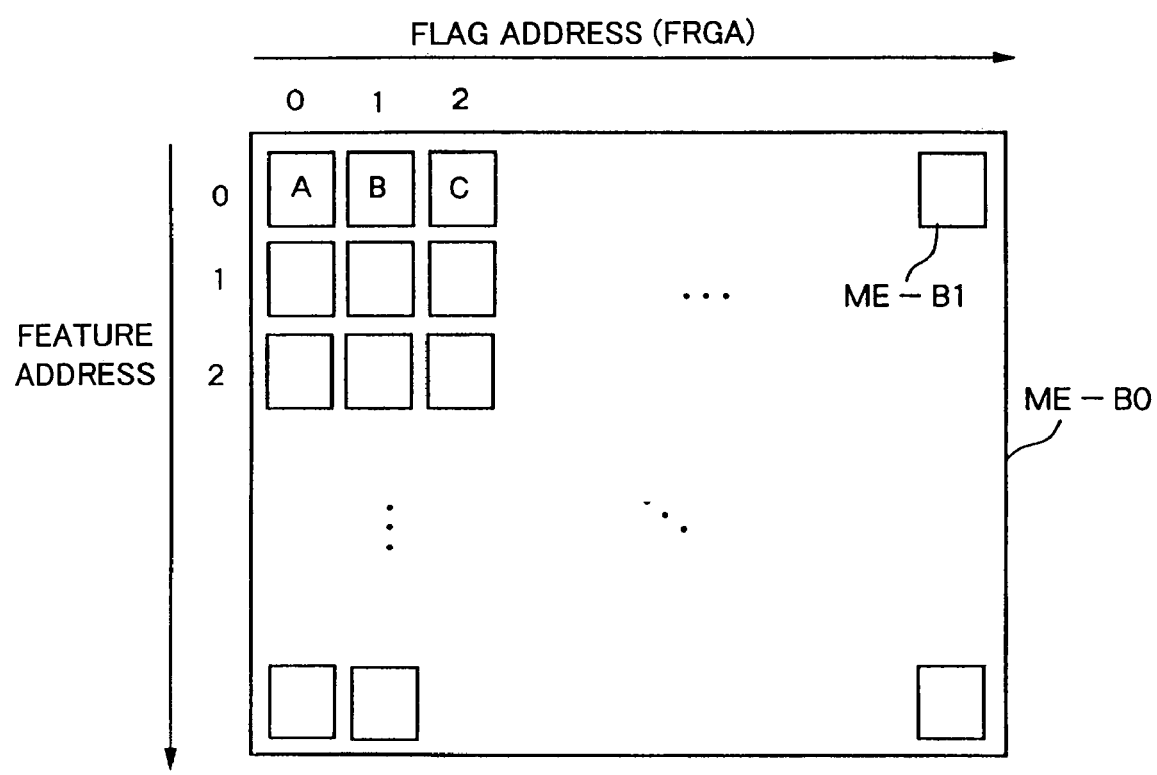
FIG. 5 is a view for explaining the configuration of a motion memory in the feature address system.

FIG. 5 is a view showing a configuration example of the ME memory wherein the feature address system is applied.

A normal memory is for storing a pixel value by using a position information of a pixel as an address, while the ME memory stores for every feature position information of pixels having the feature in flag addresses FRGA1, 2, ..., that is, B, C ... in FIG. 5 successively.

One cell ME-B1 has a storage capacity of an amount of position information. Also, the number of position information stored for the feature is stored in a flag address FRGA0.

The feature is a pixel value in a certain block having a focused pixel at its center. For example, when assuming that a block range is 3×3, the vertical direction is "i", the horizontal direction is "j", and a pixel value of a position (i, j) is L(i, j), a feature in this case becomes as in the next formula (2).

$$\{L(i-1, j-1), L(i-1, j), L(i-1, j+1), L(i, j-1), L(i, j), \\ L(i, j+1), L(i+1, j-1), L(i+1, j), L(i+1, j+1)\} \quad (2)$$

However, when using a database (memory) wherein one coordinates is corresponded to one feature (address) as such, if the feature slightly changes due to an effect of noise, it is likely that it cannot be detected at the corresponding coordinates.

A method below can be considered as a method of eliminating the disadvantage.

1) A memory wherein a plurality of features (addresses) are corresponded to one coordinates is used. By judging reliability, corresponding coordinates is determined on a reference frame Fr and a motion vector is detected.

2) A database memory (memory) wherein a plurality of features (addresses) are corresponded to one coordinates and reliability information on reliability of the correspondence relationship is also stored is used. A corresponding coordinates on a reference frame Fr is determined by judging reliability and a motion vector is detected.

Based on these methods, the present embodiment will be explained in detail.

Below, the specific configuration and function of the present motion detection device will be explained in detail with reference to drawings.

The motion detection device 10 comprises a first frame memory 11, a second frame memory 12, a first feature extraction potion 13, a second feature extraction portion 14, a database creation portion 15 and a motion vector detection portion 16.

Note that the motion vector detection portion 16 configures a motion vector calculation means according to the present invention.

Below, an outline of functions of the components of the motion detection device 10 will be explained, then, data storing method of the database creation portion 15 and an estimation function of a motion vector of the motion vector detection portion 16 will be explained in due order.

First, an outline of functions of the components of the motion detection device 10 will be explained.

The first frame memory 11 stores information one frame of an image signal input from an input terminal TIN.

The first frame memory 11 stores previously stored image information, that is, the information of a current frame Fc and outputs the previously stored image information (information of a current frame Fc) to a second frame memory 12 and the first feature extraction portion 13 when next image information is input.

In the first frame memory 11, the stored information of the current frame is stored in the second frame memory before receiving the next frame.

The second frame memory 12 stores previous image information (for example, one frame before) stored in the first frame memory 11 as information of a reference frame Fr.

In the second frame memory 12, the image information (information of the reference frame Fr) is output to the second feature extraction portion 14 before the information stored in the first frame memory 11 overwrites the second frame memory 12.

The first feature extraction portion 13 extracts a feature and spatial coordinates of a focused pixel from image information from the first frame memory 11, that is, information of a current frame Fc as the focused frame and outputs to the motion vector detection portion 16 the extracted feature as a signal S13a and the special coordinates of the focused pixel as a signal S13b.

The second feature extraction portion 14 extracts a feature of a focused pixel, a feature in the vicinity of the feature of the focused pixel, spatial coordinates of the focused pixel, a feature of the focused pixel in the feature space, and distance information as a reliability information to a value in the vicinity of the feature from an input image information, for example, information of a reference frame Fr of one frame before the focused frame, and outputs to the database creation portion 15 the extracted feature as a signal S14a, the spatial coordinates of the focused pixel as a signal S14b, and the reliability information as a signal S14c.

The database creation portion 15 registers the feature, the spatial coordinates of the focused pixel and the reliability information of the feature and spatial coordinates input as signals S14a to S14c by the second feature extraction portion 14 to the database.

Figures 6, 7:
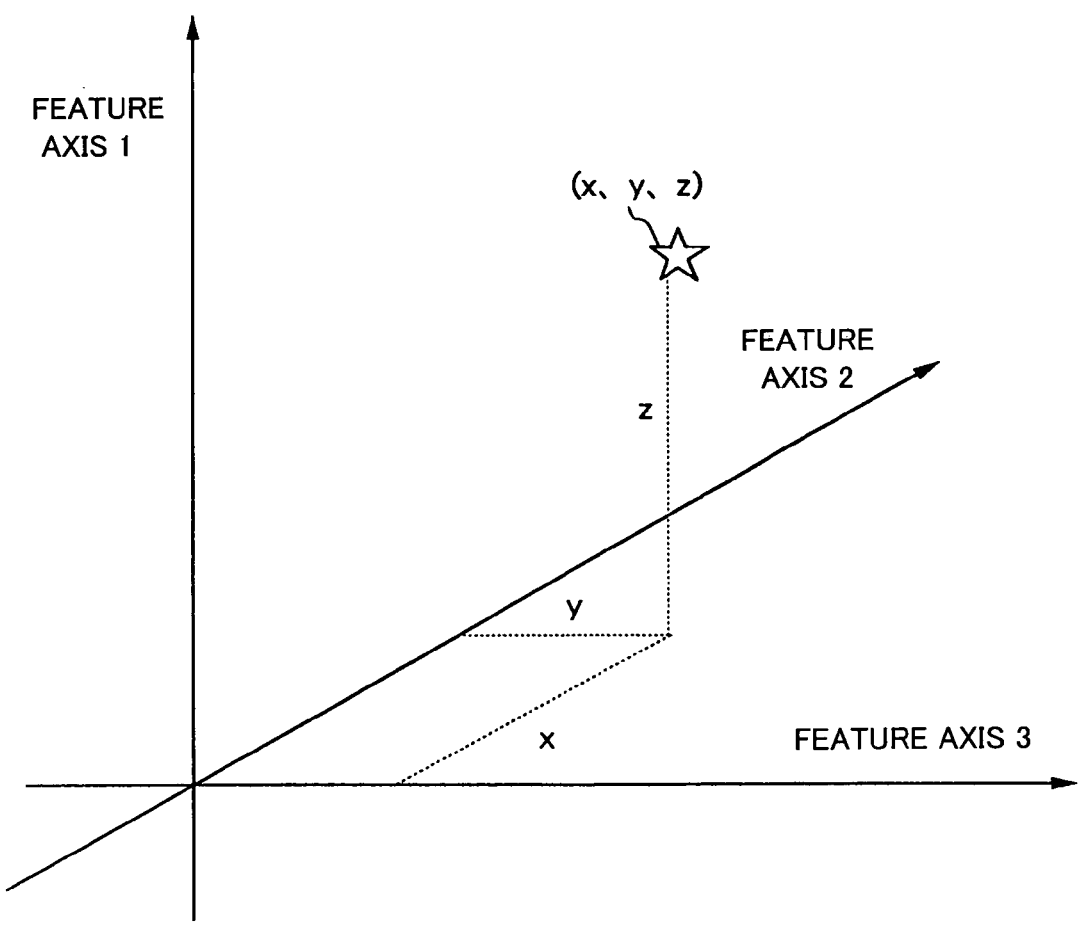
FIG. 6 is a view for explaining an example of using a pixel pattern as a feature.
FIG. 7 is a view for explaining a method of creating a feature database.

The feature here may be an image pattern of, for example, 3×1 (a block pattern made by three pixels) as shown in FIG. 6. The example in FIG. 6 is a block pattern having pixel values of A, B and C.

Below, an outline of a method of creating a feature database will be explained.

Here, in consideration of facilitating an explanation, the pattern made by three pixels shown in FIG. 6 will be taken. Assuming that the pixel values A, B and C are a feature component 1, a feature component 2 and a feature component 3, respectively, and as shown in FIG. 7, a feature space made by a feature axis 1, feature axis 2 and feature axis 3 which are axes of the feature components is taken as an example.

The example in FIG. 7 is the case wherein a feature in the spatial coordinates (w0, h0) becomes (x, y, z). As shown in FIG. 7, a feature database is created by storing the spatial coordinates (w0, h0) in a buffer linked to a position of the spatial coordinates (x, y, z) in the feature space.

Next, the structure of the feature database and a creation method thereof in the feature space in the data creation portion 15 according to the present embodiment will be explained.

Figure 8:
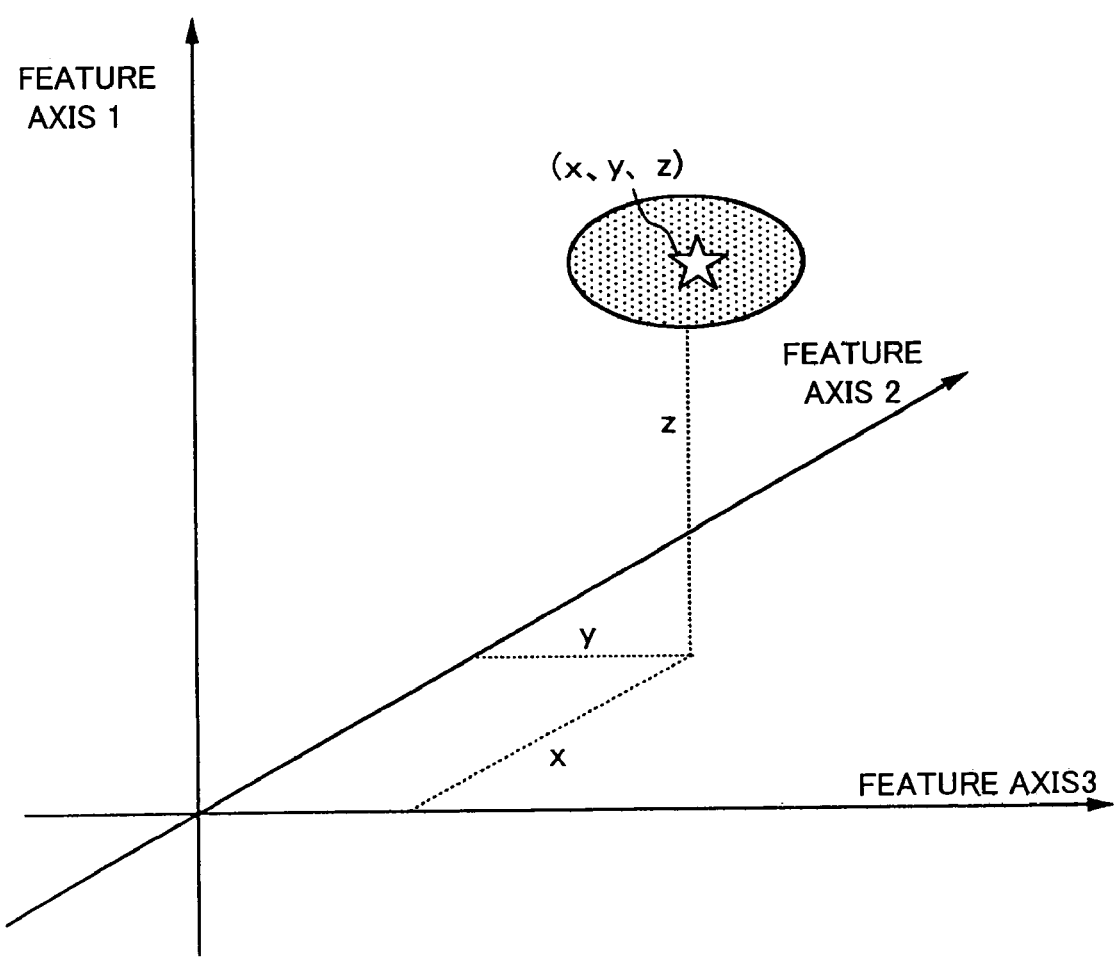
FIG. 8 is a view for explaining a method of creating a feature database.

In the present embodiment, as shown in FIG. 8, the feature database not only stores the spatial coordinates (w0, h0) in the buffer linked to the position of the coordinates (x, y, z) in the feature space, but stores information on the spatial coordinates (w0, h0) in surrounding features thereof.

This is to improve robustness when extracting a motion vector later on and making it possible to detect corresponding coordinates even when the feature information at the time of creating a database does not completely matches with feature information for actually detecting a motion vector.

In the present embodiment, other than storing the spatial coordinates (w0, h0), the coordinates (x, y, z) of the feature space and distance information between features for storing the spatial coordinates (w0, h0) are also stored at the same time. This information is used as accuracy information when matched with a feature obtained by a plurality of spatial coordinates.

FIG. 9 is a view showing an example of a structure of data to be stored in the database.

The database in this example has the structure of storing spatial coordinates of a pixel by using a feature extracted therefrom as an address and storing the reliability information of the spatial coordinates with respect to the feature.

Surrounding values of a feature of a focused pixel are linked to spatial coordinates of the focused pixel. In this case, the reliability is determined, for example, in accordance with the feature of the focused pixel and distances between features in the feature space. For example, there is a tendency that the longer the distance in the feature space, the poorer the reliability of the focused pixel to be stored.

FIG. 10 is a view showing spatial coordinates corresponding to respective features in the feature space expressed two dimensionally, and FIG. 11 is a view showing an example of reliability of the coordinates space two dimensionally.

In this example, when assuming that reliability of the focused pixel is "1", the reliability of surrounding pixels becomes "0.5" in pixels immediately above, below, on the right and left, and the reliability of periphery pixels in the oblique directions becomes "0.3".

The motion vector detection portion 16 obtains spatial coordinates information that at which position in a former (or subsequent) frame one having the same feature existed from database information S15 of the database creation portion 15 by using a feature extracted from the first feature extraction portion 13 as an index and obtains relative relationship of the obtained existing position of the same feature in the former (or subsequent) frame and spatial coordinates of an input current focused pixel, so that a motion vector is obtained (spatial coordinates to move to is obtained).

Also, the motion vector detection portion 16 estimates a motion vector based on the reliability information as will be explained later on.

In this way, the motion vector detection portion 16 searches inside the database by using a feature as an index and outputs spatial coordinates corresponding thereto. This means information of at which position one having the same feature as that of the focused pixel existed in the former or subsequent frame can be obtained.

Note that generally, the case of linking a plurality of spatial coordinates to one feature can be considered. As a method of finding a link of spatial coordinates linked in only one way, a regulation that "being in a search area of a reference of a focused pixel or not?" or "being closest from the focused pixel or not?" may be used.

Next, a data storing method of the database creation portion 15, estimation function of a motion vector in the motion vector detection portion 16, and obtaining method of reliability information will be explained specifically.

First, a data storing method will be explained with reference to FIG. 12 to FIG. 16.

Figure 12:
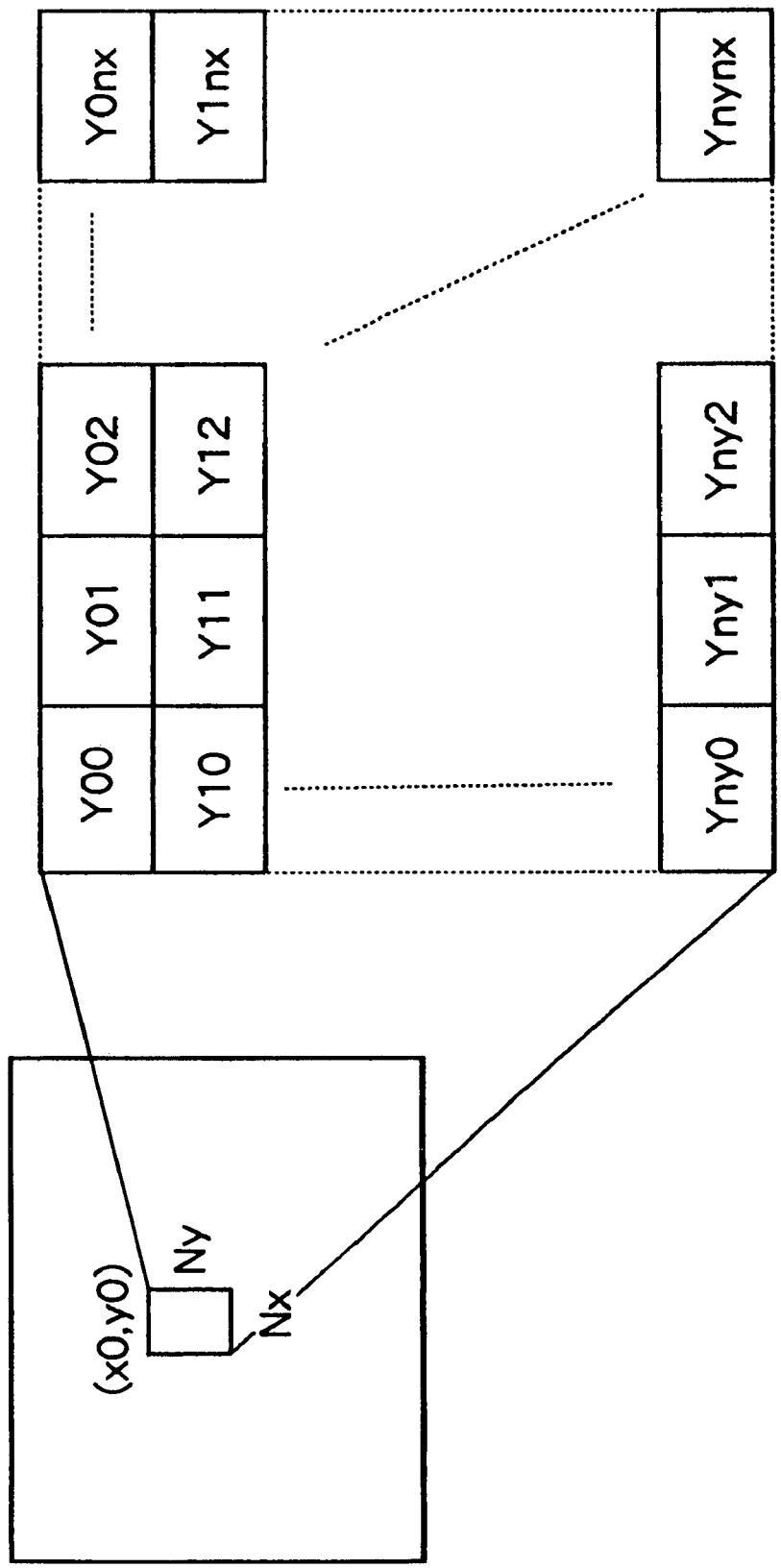
FIG. 12 is a view for explaining an input image and information near focused pixel.

FIG. 12 is a view for explaining an input image and the information in the vicinity of a focused pixel.

In FIG. 12, (x0, y0) indicates spatial coordinates of a focused image, Nx indicates a width of a block specified in the vicinity of the focused pixel, Ny indicates a height of the block specified in the vicinity of the focused pixel, and Yij indicates pixel level in the block region in the vicinity of the focused pixel, respectively.

Here, as a general example, it is defined to express a block having a height of Ny and a width of Nx at the spatial coordinates (x0, y0) in an image and a value of pixels in the block as Yij. An explanation will be made by using the expression below.

The feature is not limited to a specific feature, but a feature used in the present embodiment is assumed to be a vector made by a luminance value of every pixel in a block to facilitate understanding.

Figure 13:
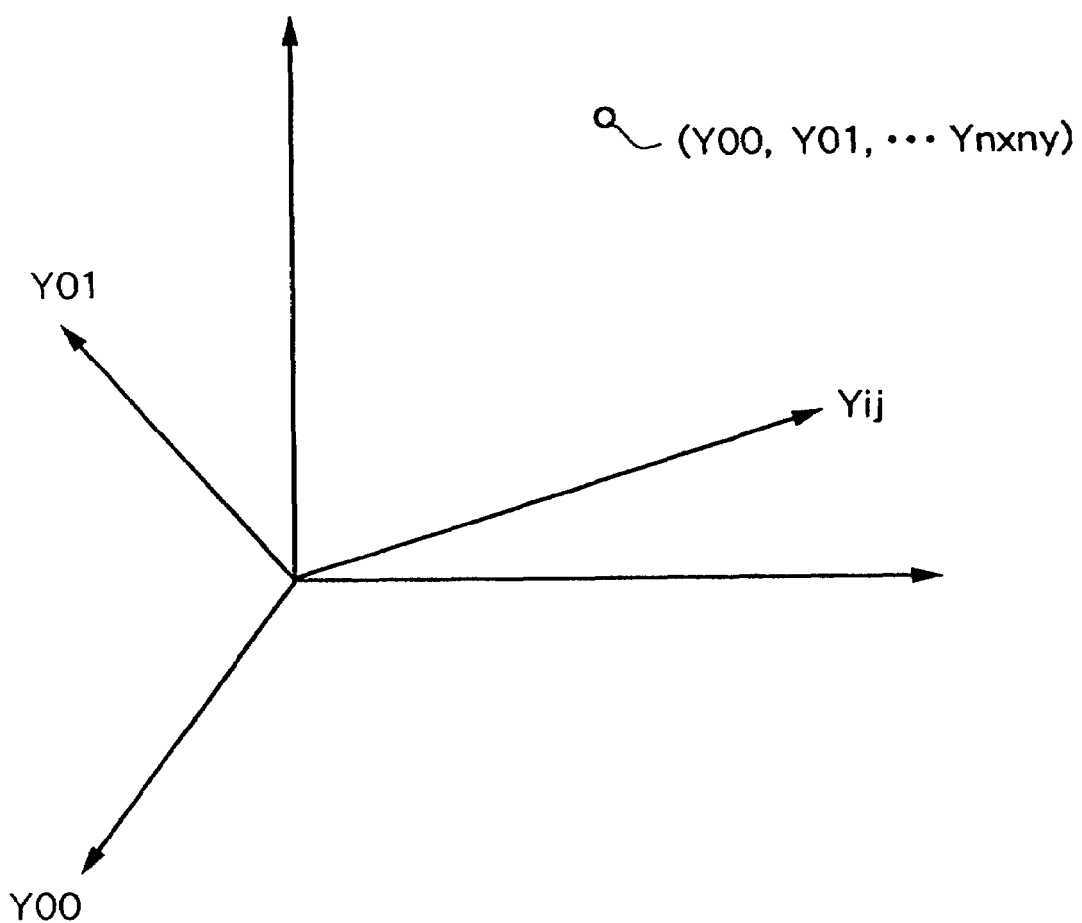
FIG. 13 is a view showing a space in nx×ny dimension.

FIG. 13 is a view showing a space of nx×ny dimension.

FIG. 13 shows an example of the most basic case. Here, when assuming that a luminance pattern in a block having a size Nx×Ny in the spatial coordinates (x0, y0) in an image one frame before a focused frame is as shown in FIG. 11, values (coordinates, reliability information) of (x0, y0) corresponding to coordinates (Y00, Y01, . . . Ynxny) in the feature space are stored in the feature database.

Figure 14:
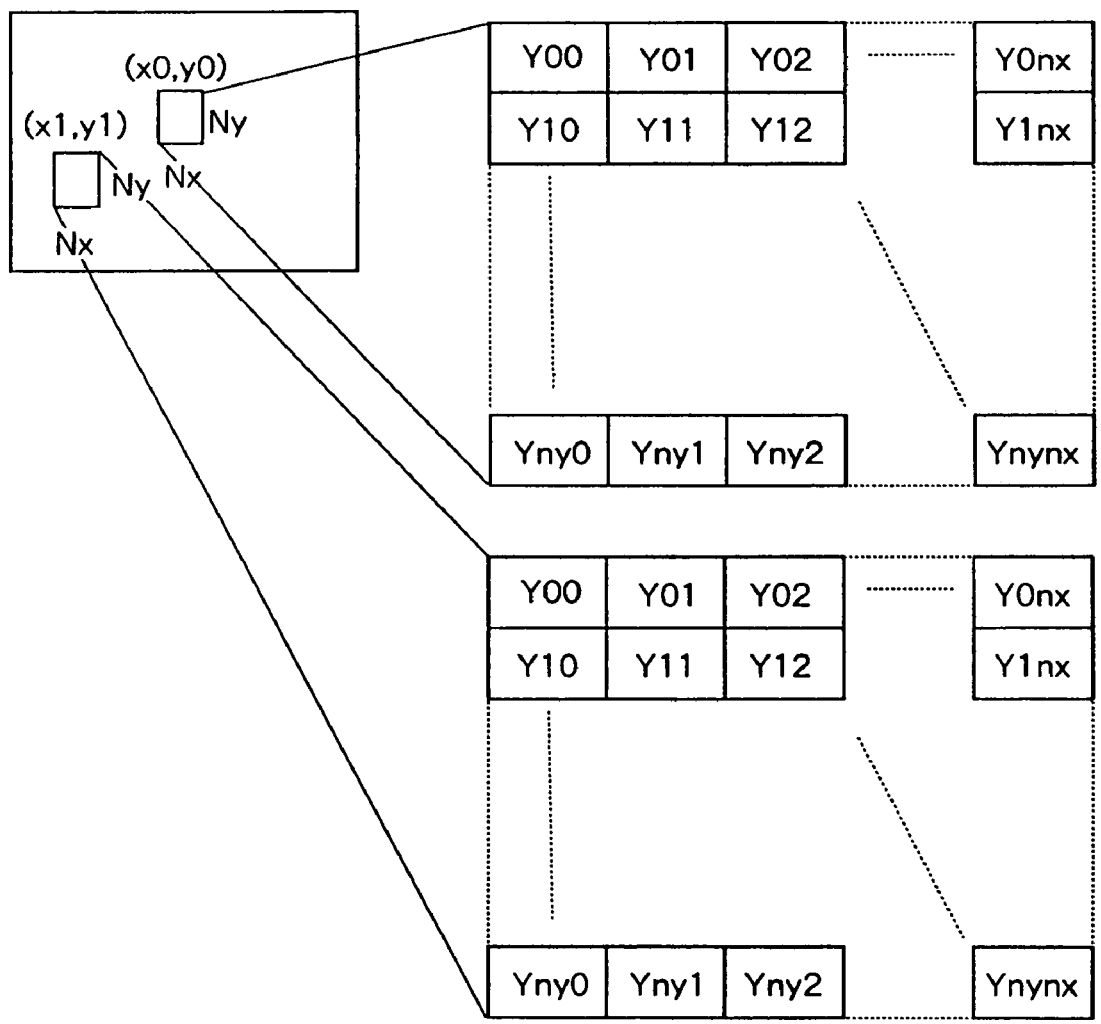
FIG. 14 is a view for explaining an example of storing at the same coordinates in the space of nx×ny dimension in FIG. 12 since a pattern of the coordinates (x0, y0) and a pixel pattern of the coordinates (x1, y1) are the same in an image one frame before.

FIG. 14 is a view for explaining an example of storing at the same coordinates in the space of nx×ny dimension in FIG. 13 because a pattern of the coordinates (x0, y0) and a pixel pattern of the coordinates (x1, y1) are the same in an image one frame before.

In the case where the pixel pattern of a block at the spatial coordinates (x1, y1) in an image becomes (Y00, Y01, . . . Ynxny) to be the same pixel pattern as that at (X0, y0), since the feature is the same, so that they are stored at the same coordinates in the feature space.

Accordingly, values of two coordinates (x0, y0) and (x1, y1) are stored in (Y00, Y01, . . . Ynxny).

The fact that data stored at the coordinates (Y00, Y01, . . . , Ynxny) in the feature space is (x0, y0) and (x1, y1) means a pixel pattern in the vicinity of the spatial coordinates (x0, y0) one frame before is same as a pixel pattern in the vicinity of the coordinates (x1, y1).

Figure 15:
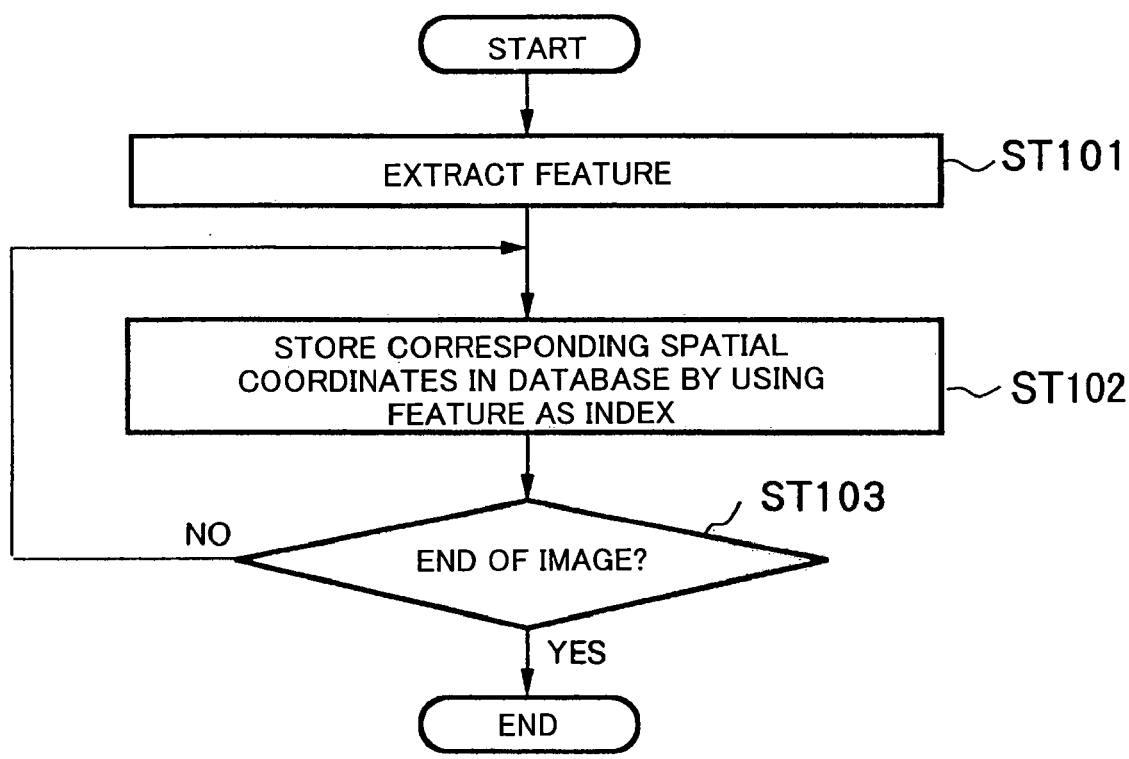
FIG. 15 is a flowchart showing a procedure of creating a basic database of a database creation portion.

FIG. 15 is a flowchart showing a procedure of preparing a basic database of the database creation portion 15.

As shown in FIG. 15, the second feature extraction portion 14 extracts a feature of a reference frame Fr (step ST101) and supplies the same to the database creation portion 15.

The database creation portion 15 performs an operation of storing in the database corresponding spatial coordinates by using a feature as an index before ending an image (steps ST102 and ST103).

Also, in the present embodiment, the motion vector detection portion 16 estimates a motion vector based on the reliability information.

As methods of obtaining the reliability information, a method of calculating the reliability based on a feature in advance and holding in a database when creating the database and a method of calculating the reliability based on a feature at the time of obtaining a motion vector can be applied.

In those case, when calculating the reliability at the time of creating the database, the reliability J of each coordinates in each feature is calculated and the reliability J is registered together with the spatial coordinates (x0, y0) of the pixel when storing in the database.

Figure 16:
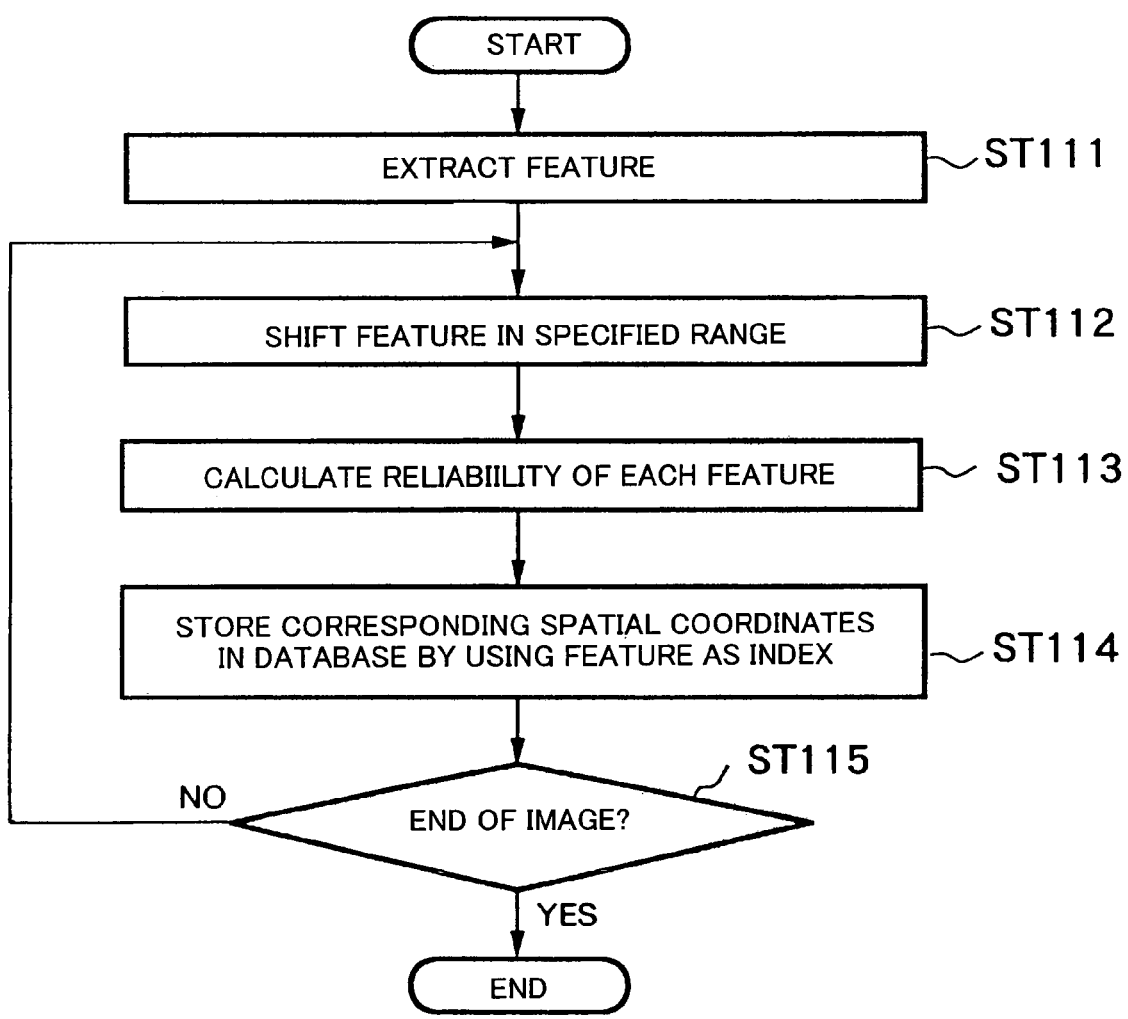
FIG. 16 is a flowchart showing a procedure of creating a database of calculating reliability based on a feature in advance and storing in the database when creating the database.

FIG. 16 is a flowchart showing a database creation procedure of calculating the reliability based on a feature in advance and holding in the database when creating the database.

As shown in FIG. 16, the second feature extraction portion 14 extracts a feature at the spatial coordinates (x0, y0) of a reference frame Fr (step ST111) and supplies the same to the database creation portion 15.

The database creation portion 15 shifts the feature in a specified range (step ST112) and calculates the reliability J of the coordinates (x0, y0) for each feature (step ST113).

Then, an operation of storing spatial coordinates (x0, y0) and the corresponding reliability information into the database by using each feature as an index until an image ends is performed (steps ST114 and ST115).

Next, the motion vector estimation based on the reliability information in the motion vector detection portion 16 will be explained.

Here, an explanation will be made on three forms: motion vector estimation using a reliability information based on a spatial distance of an image, a motion vector estimation using the reliability information based on a feature of an image, and a motion vector estimation using a reliability information wherein a feature of an image and a reliability information based on partial coordinates of the image are put together.

First, the motion vector estimation using the reliability information based on a spatial distance of an image will be explained.

A method of obtaining a motion vector when a feature database is created as above will be as explained below.

The case of obtaining a motion vector by using the reliability information based on a spatial distance of an image can be obtained as below.

$$\text{Evaluation Value } J = \Delta L \quad (3)$$

The $\Delta L$ expresses the spatial distance of an image and, for example, a distance L between (x0, y0) and (x1, y1) can be expressed as below.

$$\Delta L = |(x1, y1) - (x0, y0)| \quad (4)$$

Figure 17:
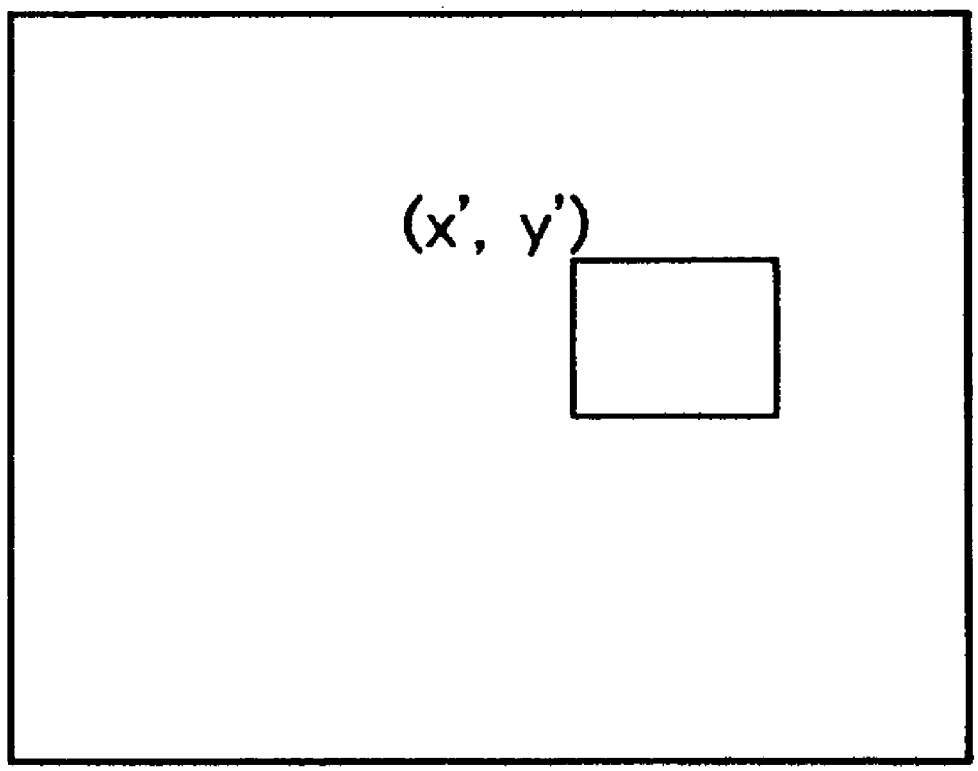
FIG. 17 is a view showing a focused pixel in an image.

As shown in FIG. 17, a motion vector at coordinates (x', y') of #n+1 frame can be obtained as below.

First, a value of a vicinity pixel at the coordinates (x', y') in the #n+1 frame is obtained.

Next, by using a pixel pattern obtained from a feature database of the database creation portion 15, data stored there is obtained.

When data stored in the database is (x0, y0) and (x1, y1), that is, there are a plurality of possible coordinates, one having the minimum reliability based on a spatial distance in an image is regarded as a motion vector.

Namely, for example, if the reliability based on a spatial distance of the image is an absolute value of a spatial distance, a condition of the formula 5 below, $$|(x', y') - (x0, y0)| > |(x', y') - (x1, y1)| \quad (5)$$

that is, when a condition of the next formula 6 is satisfied, the formula 7 is the solution of the motion vector, while when not satisfied, the formula 8 is the solution of the motion vector.

$$\Delta L0 > \Delta L1 \quad (6)$$

$$\{(x', y') - (x0, y0)\} \quad (7)$$

$$\{(x', y') - (x1, y1)\} \quad (8)$$

The above is algorithm of basic motion vector detection.

Next, the case of introducing reliability as a method of obtaining possible coordinates will be explained.

Namely, the motion vector estimation using the reliability information based on a feature of an image will be explained.

In the example explained above, the reliability was calculated based on a spatial distance of an image, but a reliability regarding a feature is newly introduced here.

The reliability based on a feature that will be introduced below is defined as an amount expressing how much a feature T to be evaluated is deviated with respect to a reference feature T0.

The case of obtaining a motion vector using the reliability information based on a feature can be obtained as below.

$$\text{Evaluation Value } J = \Delta T \quad (9)$$

The $\Delta T$ expresses a difference amount with respect to a reference feature in a feature space, and a distance between features is an example thereof. In the following explanation, the distance between features is taken as an example.

Here, when making the feature T correspond to the above specific example above, T0=(Y00, Y01, . . . YnxYny), etc. is one example thereof.

At this time, when T0, T1=(Y00', Y01', . . . YnxYny'), T2=(Y00'', Y01'', . . . YnxYny''), a method of calculating possible coordinates becomes as below.

A motion vector at coordinates (x', y') of #n+1 frame can be obtained as below.

First, a value of a vicinity pixel at coordinates (x', y') in the #n+1 frame is obtained.

Next, by using a pixel pattern obtained from the feature database of the database creation portion 15, data stored there is obtained.

When data stored in the database is (x0, y0) and (x1, y1), that is, when there are a plurality of candidate coordinates, one having minimum reliability based on an error amount between features (here, $\Delta T1$ and $\Delta T0$) is regarded as a motion vector. Namely, when a condition of the formula 10 below is satisfied, the formula 11 is the solution of the motion vector, while when not satisfied, the formula 12 is the solution of the motion vector.

$$\Delta T1 > \Delta T0 \tag{10}$$

$$\{(x', y') - (x0, y0)\} \tag{11}$$

$$\{(x', y') - (x1, y1)\} \tag{12}$$

Next, the motion vector estimation using the reliability information wherein a feature of an image and the reliability information based on spatial coordinates of the image are put together will be explained.

A method of creating integrated reliability as the new reliability information wherein a feature of an image and reliability information based on spatial coordinates of the image are put together is as below. "w0" and "w1" are coefficients of weighting.

$$\text{Evaluation Value } J = \Delta I = w0 \times \Delta L + w1 \times \Delta T \tag{13}$$

A motion vector at coordinates (x', y') of the #n+1 frame can be obtained as below.

First, a value of a vicinity pixel of the coordinates (x', y') in the #n+1 frame is obtained.

Next, by using a pixel pattern obtained from the feature database of the database creation portion 15, data stored there is obtained.

When data stored in the database is (x0, y0) and (x1, y1), that is, there are a plurality of candidate coordinates, one having minimum reliability based on an error amount in integrated reliability is regarded as a motion vector. Namely, when assuming that the reliability based on a spatial distance of an image is, for example, an absolute value of the spatial distance, if a condition of the next formula 14 is satisfied, the formula 15 is the solution of the motion vector, while when not satisfied, the formula 16 is the solution of the motion vector.

$$\Delta I1 > \Delta I0 \tag{14}$$

$$\{(x', y') - (x0, y0)\} \tag{15}$$

$$\{(x', y') - (x1, y1)\} \tag{16}$$

Conditions of the following formula 17 are $$Y00' < Y00 < Y00''$$

$$Y01' < Y01 < Y01''$$

$$\vdots$$

$$Ynxny' < Ynxny < Ynxny'' \tag{17}$$

Namely, it expresses that when the coordinates stored at coordinates (Y00, Y01, . . . , Ynxny) is (x0, y0) and the coordinates stored at coordinates (Y00+1, Y01, . . . , Ynxny) is (x1, y1), if a condition of the next formula 18 is satisfied, a possible motion vector becomes (x1, y1).

$$|(x', y') - (x0, y0)| > |(x', y') - (x1, y1)| \tag{18}$$

Note that when the coordinates stored at coordinates (Y00+1, Y01, . . . , Ynxny) is (x2, y2), even if a condition of the formula 19 below is satisfied, in the case where a distance of (x2, y2) and (x0, y0) is long, it is not realistic to regard (x2, y2) as the possible motion vector.

$$|(x', y') - (x0, y0)| > |(x', y') - (x2, y2)| \tag{19}$$

Thus, in the present embodiment, the above problem is solved by giving an upper limit to the motion vector value in addition to an evaluation only by an image pattern.

Next, a method of obtaining the reliability information will be explained.

A motion vector estimation method based on the reliability was explained so far. In this method, the reliability based on a spatial feature of an image can be obtained only at the time of obtaining a motion vector, while the reliability based on a feature can be obtained also at the time of creating a database.

Accordingly, a method of obtaining the reliability based on a feature will be explained with two specific examples.

A first method is to calculate the reliability based on a feature in advance at the time of creating a database and to hold in the database, and a second method is to calculate the reliability based on a feature at the time of obtaining a motion vector.

Note that a method of calculating the reliability based on a feature in advance at the time of creating a database and holding in the database was already explained, so that the detail will be omitted here.

Figure 18:
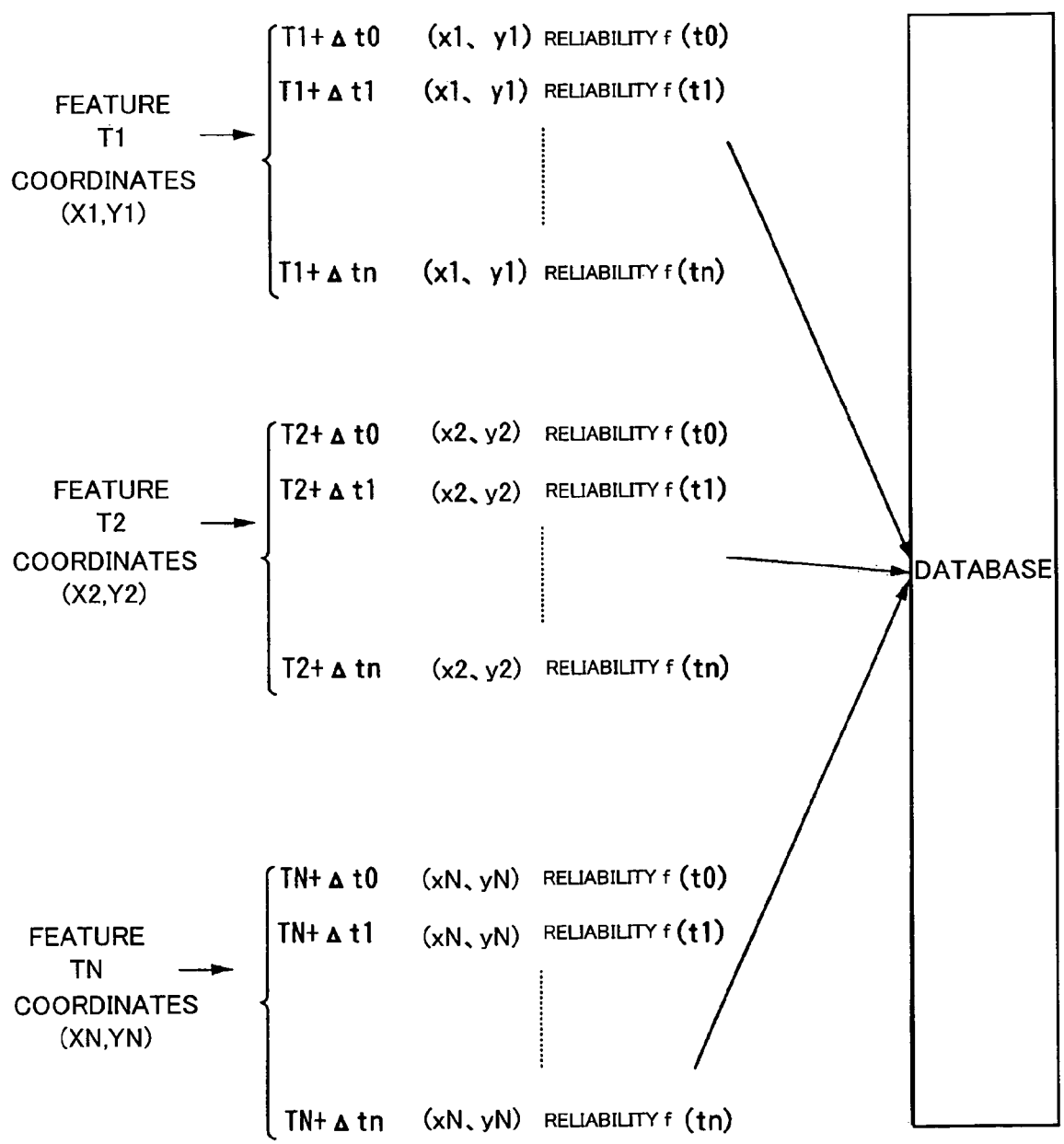
FIG. 18 is a view showing an image of calculation of each feature in the case of storing reliability information based on a feature in a database.

Note that FIG. 18 is a view showing an image of calculating each feature in the case of storing the reliability information based on a feature in the database.

This example indicates an image of storing in the database a feature T1 at the coordinates (x1, y1), a feature T2 at the coordinates (x2, y2), a feature TN at coordinates (xN, yN), each coordinates and reliability f. The coordinates (x1, y1) will be considered. A feature of the coordinates (x1, y1) is T1. Here, the feature is shifted exactly by $\Delta ti$ (i=0, 1, 2, , n), it is made to associate with each feature T1+$\Delta ti$, and the coordinates (x1, y1) and the reliability f with respect to each feature at coordinates (x1, y1) is stored.

Here, a method of calculating the reliability based on a feature at the time of obtaining a motion vector will be explained.

A motion vector at the coordinates (x', y') of the #n+1 can be obtained as below.

First, a value of a vicinity pixel of the coordinates (x', y') in the #n+1 frame is obtained.

Next, by using a pixel pattern obtained from a feature database of the database creation portion 15, data stored there is obtained.

By changing the feature to a certain extent, the reliability based on a feature in accordance with a change amount of the feature is calculated for each feature.

Then, in a search range in a feature space, one having the smallest reliability based on a difference amount between total evaluation values J defined above is regarded as a motion vector. Namely, when assuming that the smaller the total evaluation value, the higher the reliability, if a condition of the formula 20 is satisfied, the formula 21 is the solution of the motion vector, while when not satisfied, the formula 22 is the solution of the motion vector.

$$\Delta T1 > \Delta T0 \tag{20}$$

$$\{(x', y') - (x0, y0)\} \tag{21}$$

$$\{(x', y') - (x1, y1)\} \tag{22}$$

Figure 19:
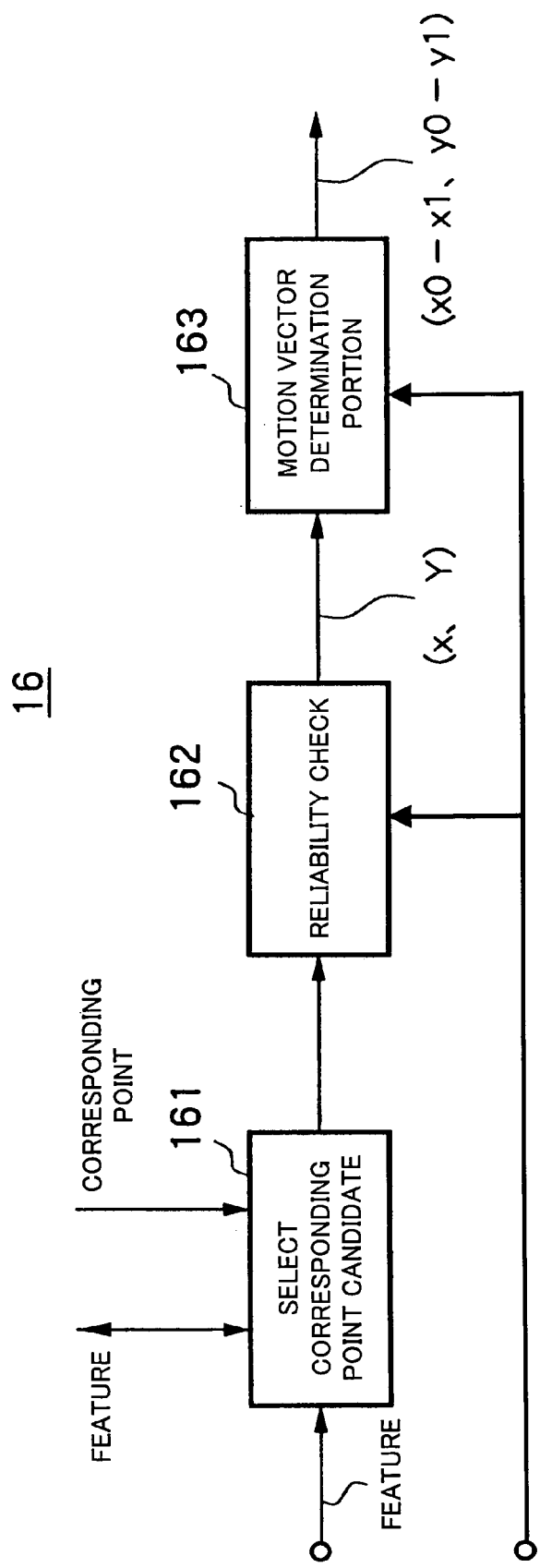
FIG. 19 is a block diagram showing a configuration example of a motion vector detection portion according to the present embodiment in the case of using information of spatial coordinates when checking reliability.
Figure 20:
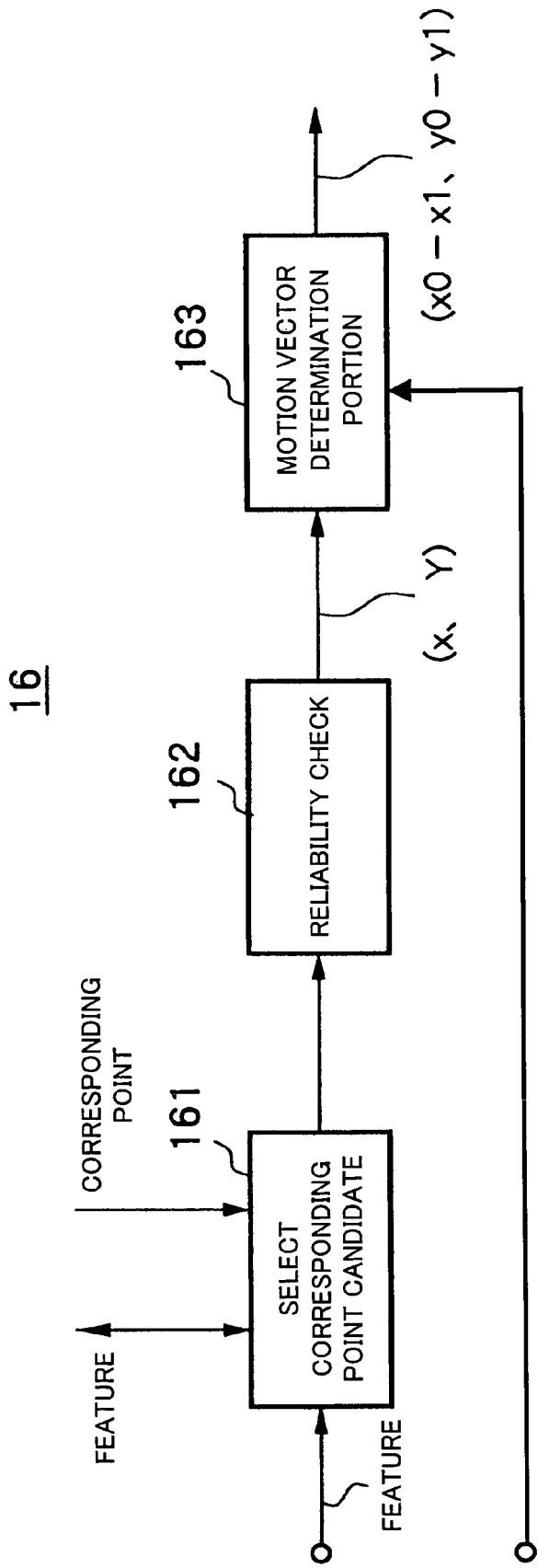
FIG. 20 is a block diagram showing a an example of configuration of a motion vector detection portion according to the present embodiment in the case of not using information of spatial coordinates when checking reliability.

FIG. 19 and FIG. 20 are block diagrams showing an example of a specific configuration of the motion vector detection portion 16. FIG. 19 shows the case of also using information of spatial coordinates for the reliability checking, and FIG. 20 shows the case of not using information of spatial coordinates for the reliability checking.

The motion vector detection portion 16 comprises, as shown in FIG. 19 and FIG. 20, a corresponding point candidate selection portion 161, a reliability checking portion 162 and a motion vector determination portion 163.

The corresponding point candidate selection portion 161 performs searching (matching) for selecting candidates in a range of an input feature of T±ΔT when the reliability information is stored in the database creation portion 15.

The corresponding point candidate selection portion 161 performs matching with an input feature itself and calculates the reliability when the reliability information is not stored in the database creation portion 15.

The reliability checking portion 162 checks whether the above each conditions of reliability is satisfied or not and supplies the check result to the motion vector determination portion 163.

The motion vector determination portion 163 obtains a solution of a motion vector based on the reliability check result.

Figure 21:
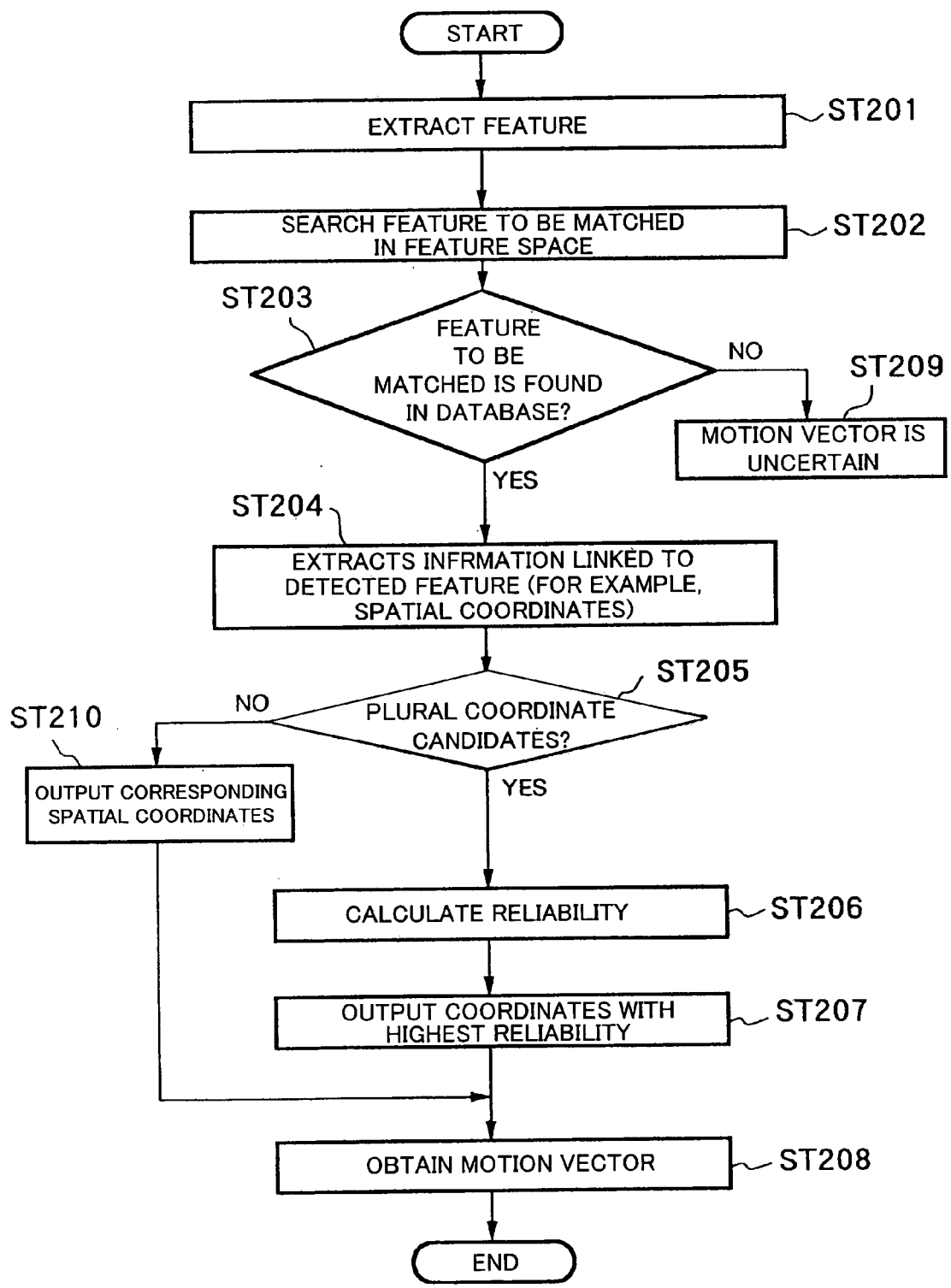
FIG. 21 is a flowchart for explaining an operation of a motion vector detection portion in the case of using spatial reliability of an image.

FIG. 21 is a flowchart for explaining an operation of the motion vector detection portion 16 when a plurality of features are corresponded to one coordinates. In this example, the reliability is calculated in the motion vector detection portion 16.

As shown in FIG. 21, a first feature extraction portion 13 extracts a feature of a current frame Fc (step ST201) and supplies to the motion vector detection portion 16.

In the motion vector detection portion 16, the corresponding point candidate selection portion 161 searches a feature which matches with data stored in the database in a feature space (step ST202).

Then, when a feature to be matched is found in the database (step ST203), information linked to the detected feature, for example, the spatial coordinates is extracted (step ST204).

When processing in the step ST204 is finished, whether there are a plurality of candidate coordinates or not is judged (step ST205).

When there are a plurality of candidate coordinates, the reliability is calculated (step ST206), and the reliability checking portion 162 outputs coordinates having the highest reliability to the motion vector determination portion 163 (step ST207).

Then, in the motion vector determination portion 163, a motion vector is obtained based on a predetermined condition (step ST208).

Note that in the step ST203, when a feature to be matched is not found in the database, it is judged that the motion vector is uncertain (step ST209).

Also, in the step ST205, when it is judged that there are not a plurality of candidate coordinates but one, the corresponding spatial coordinates is output to the motion vector determination portion 163 via the reliability checking portion 162 (step ST210) and the procedure proceeds to the processing in the step ST208.

The above is the case of using a memory storing spatial coordinates so that a plurality of features (addresses) correspond to one spatial coordinates. Other than the above, the perfect motion vector detection can be performed also when using a memory storing spatial coordinates so that one feature (address) corresponds to one spatial coordinates. The method will be explained below.

Figure 22:
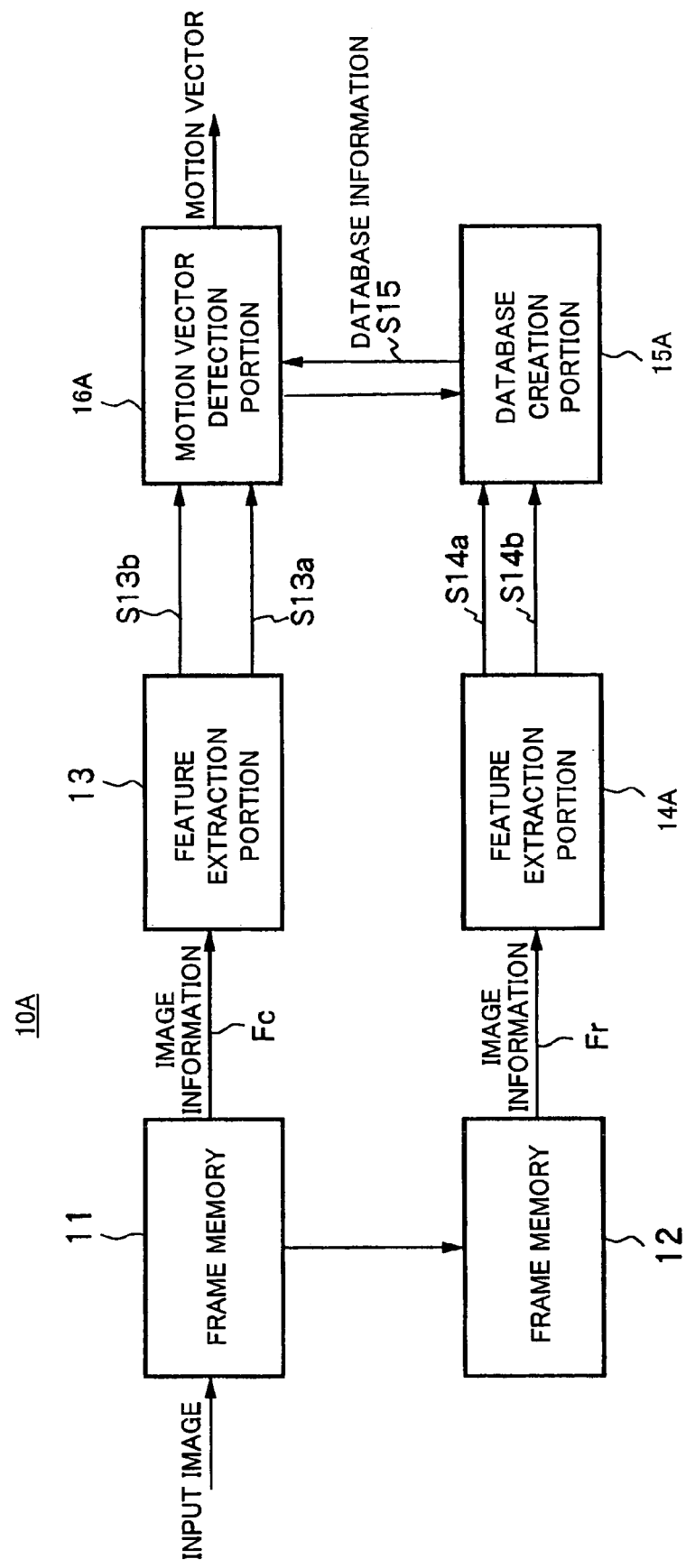
FIG. 22 is a block diagram showing another embodiment of a motion detection device as a key part of an image processing device according to the present invention.

A motion detection device 10A in this case is shown in FIG. 22.

What the motion detection device 10A differs from the motion detection device 10 in FIG. 4 is a feature extraction portion 14A, a database creation portion 15A and a motion vector detection portion 16A.

The feature extraction portion 14A does not output the reliability information but outputs the spatial coordinates and the feature to the database creation portion 15A.

The database creation portion 15A stores the input spatial coordinates at an address corresponding to the input feature in the database (memory).

The motion vector detection portion 16A changes the input feature. Then, by using the input feature and the changed feature, address spatial coordinates corresponding to these features are obtained from the database creation portion 15A. Then, the reliability judgment is performed on the obtained spatial coordinates, so that a motion vector is detected.

Figure 23:
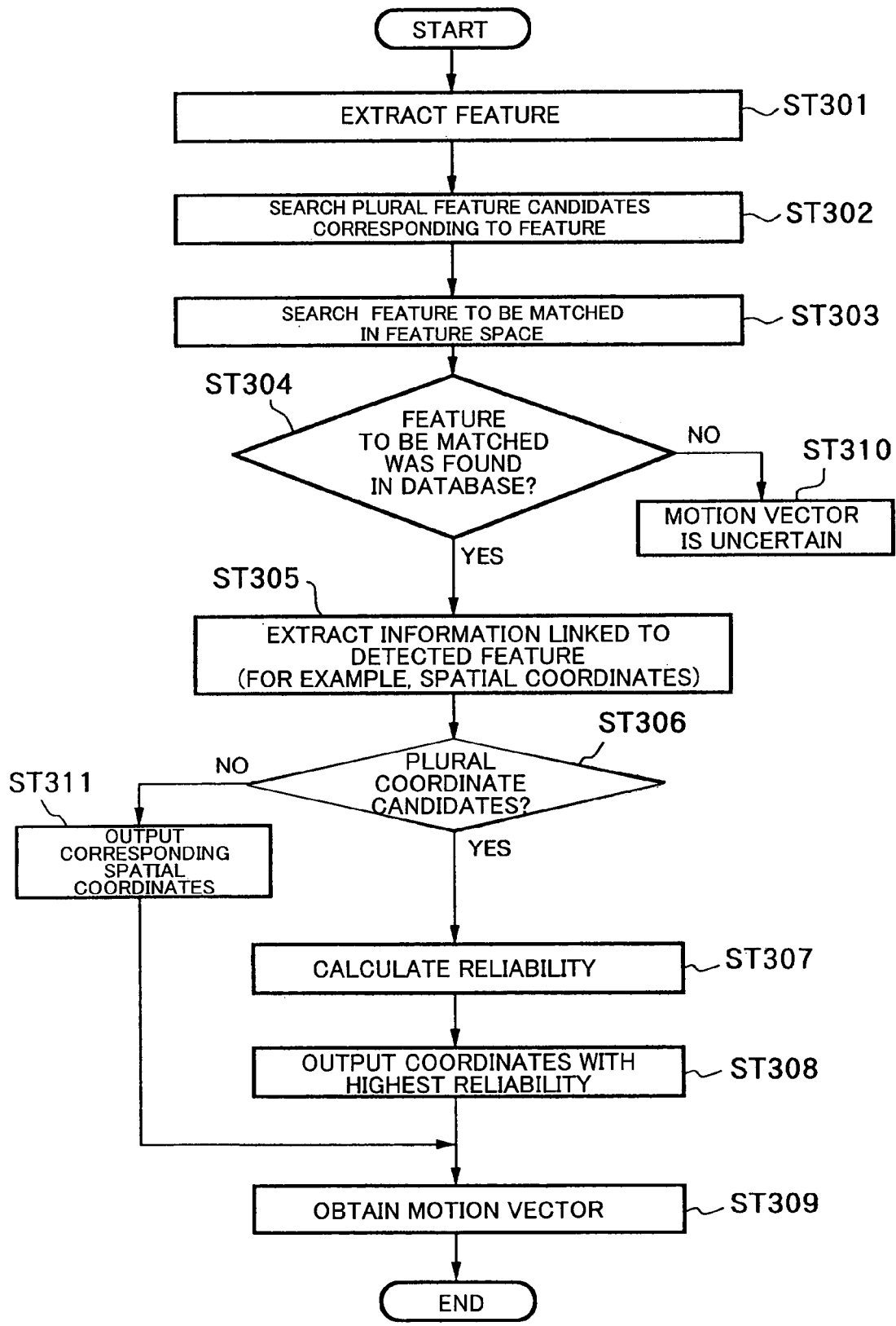
FIG. 23 is a flowchart for explaining an operation of a motion vector detection portion in the case of evaluating a distance at the time of a motion vector based on a feature in the device in FIG. 22.

FIG. 23 is a flowchart for explaining an operation of the motion vector detection portion 16A in this case.

As shown in FIG. 23, the first feature extraction portion 13 extracts a feature of the current frame Fc (step ST301) and supplies the same to the motion vector detection portion 16.

In the motion vector detection portion 16A, the corresponding point candidate selection portion 161 searches based on a plurality of candidate features corresponding to the feature (step ST302).

Also, the corresponding point candidate selection portion 161 searches a feature to be matched with data stored in the database in the feature space (step ST303).

When a feature to be matched is found in the database (step ST304), information linked to the detected feature, for example, the spatial coordinates is extracted (step ST305).

When processing in the step ST305 is finished, whether there are a plurality of candidate coordinates or not is judged (step ST306).

When there are a plurality of candidate coordinates, the reliability is calculated (step ST307), and the reliability check portion 162 outputs coordinates with the highest reliability to the motion vector determination portion 163 (step ST308).

Then, in the motion vector determination portion 163, a motion vector is obtained based on a predetermined condition (step ST309).

Note that in the step ST304, when a feature to be matched is not found in the database, it is judged that the motion vector is uncertain (step ST310).

Also, in the step ST305, when it is judged that there is not a plurality of candidate coordinates but one, the corresponding spatial coordinates is output to the motion vector determination portion 163 via the reliability checking portion 162 (step ST311).

Figure 24:
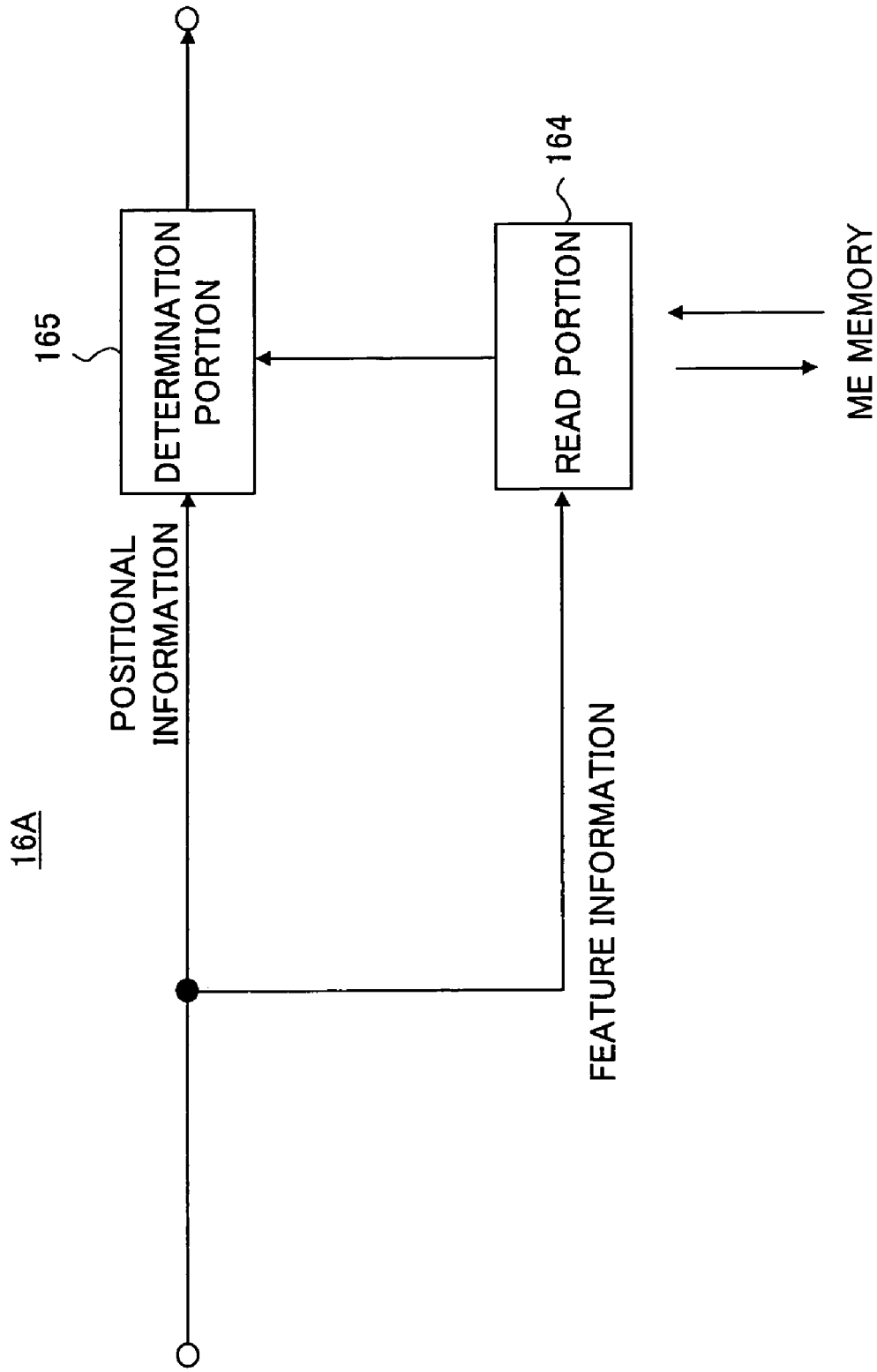
FIG. 24 is a block diagram of another example of a configuration of a motion vector detection portion according to the present embodiment.

Further, FIG. 24 is a view showing another example of a configuration of the motion vector detection portion 16A.

The motion vector detection portion 16A comprises a read portion 164 and a determination portion 165.

The read portion 164 changes a feature based on the feature information, reads spatial coordinates of a plurality of features (addresses) from the database (memory) and sends to the determination portion 165. At this time, if necessary, the reliability of the feature is obtained and sent to the determination portion 165. Also, the reliability of the feature is calculated in the read portion 164.

Figure 25:
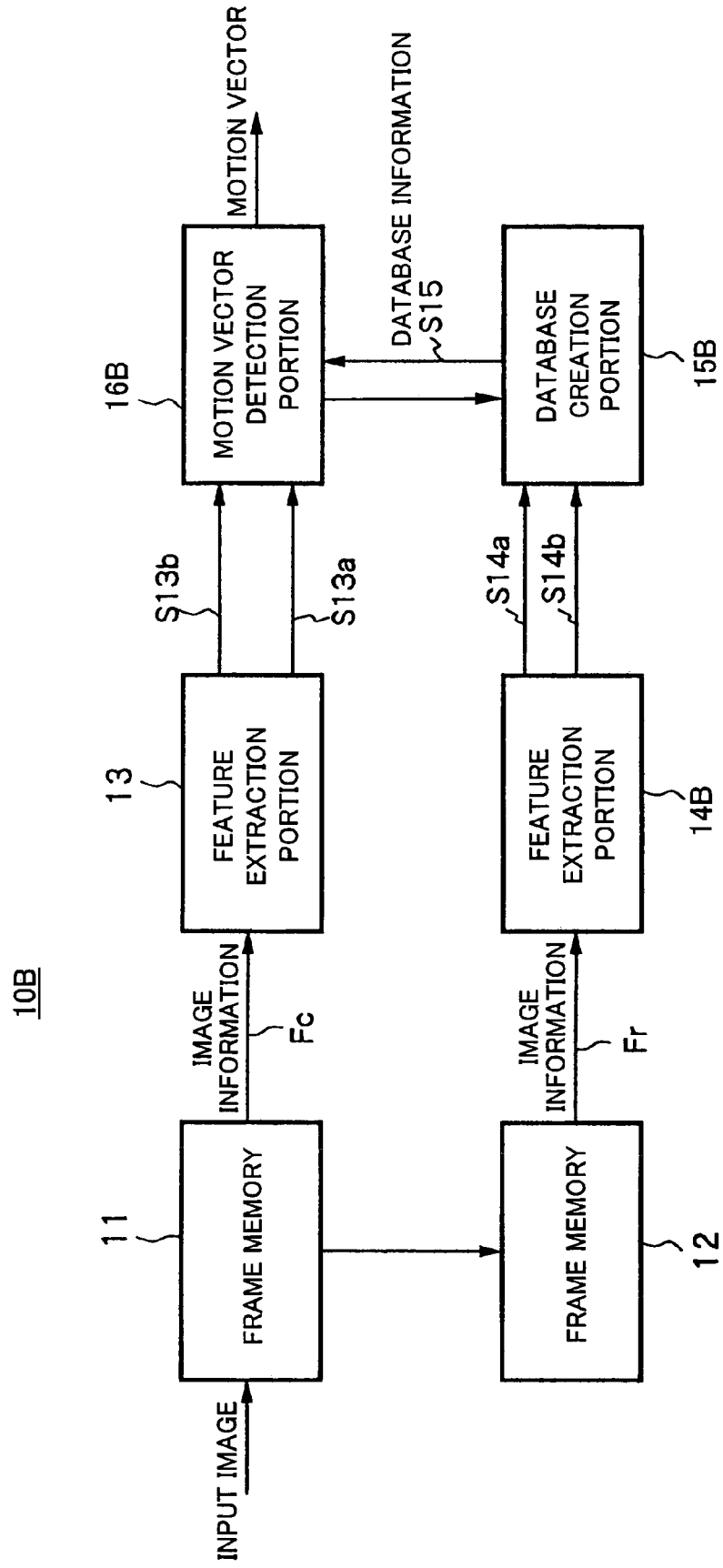
FIG. 25 is a block diagram showing still another embodiment of a motion detection device as a key part of an image processing device according to the present invention.

Also, FIG. 25 is a view showing still another example of a configuration of the motion detection device.

This is an example of a motion detection device using a database (memory) storing one spatial coordinates at addresses corresponding to a plurality of features. The database (memory) does not store the reliability information.

What the motion detection device 10B differs from the motion detection device 10 in FIG. 4 is a feature extraction portion 14B, a database creation portion 15B and a motion vector detection portion 16B.

The feature extraction portion 14A extracts a feature, changes the feature exactly by ±Δ and outputs the changed plurality of spatial coordinates to the database creation portion 15B.

The database creation portion 15B stores the input spatial coordinates at an address corresponding to the input feature in the database (memory).

The motion vector detection portion 16B obtains address spatial coordinates corresponding to the input feature from the database creation portion 15B, performs a reliability judgment on the obtained spatial coordinates and detects a motion vector.

When assuming that the motion vector detection portion 16B has the same configuration as that in FIG. 24, for example, the read portion 164 reads spatial coordinates (reliability information) of a feature (address) from the database (memory) and sends to the determination portion 165. Also, at that time, if necessary, the reliability of the feature is also obtained and sent to the determination portion 165. Also, the reliability of the feature is calculated in the read portion 164.

Finally, an operation of the motion detection device in FIG. 4 will be explained.

A first frame memory 11 stores one frame of information in an image signal input from the input terminal TIN.

In the second frame memory 12, the previous image information (for example, one frame before) stored in the first frame memory 11 is stored as information of the reference frame Fr.

In the second frame memory 12, the image information (information of the reference frame Fr) is output to the second feature extraction portion 14 before the second frame memory 12 is overwritten by information stored in the first memory 11.

In the second feature extraction portion 14, the feature, spatial coordinates of a focused pixel and the vicinity of the focused pixel, and spatial distance information between the spatial coordinates and the focused pixel are extracted from the input image information, for example, from information of the reference frame Fr of one frame before a focused frame.

Then, the extracted feature is output as a signal S14a, the spatial coordinates of the focused pixel and the vicinity thereof is output as a signal S14b, and the spatial distance information between the spatial coordinates and the focused pixel is output as a signal S14c to the database creation portion 15.

In the database creation portion 15, linkage of the input feature, spatial coordinates of the focused pixel and the vicinity thereof input as signals S14a to S14c is registered to a database by the second feature extraction portion 14.

Then, for example, an image input at the next timing is once stored in the first frame memory 11 and then supplied to the first feature extraction portion 13.

In the first feature extraction portion 13, the feature and spatial coordinates of a focused pixel are extracted from image information from the first frame memory 11, that is, the feature from information of the current frame Fc as the focused frame. Then, the extracted feature is output as a signal S13a and the spatial coordinates of the focused pixel is output as a signal S13b to the motion vector detection portion 16.

In the motion vector detection portion 16, by using the feature extracted in the first feature extraction portion 13 as an index, the spatial coordinates information indicating at which position one having the same feature existed in a former (subsequent) frame is obtained from the database information S15 of the database creation portion 15.

By obtaining relative relationship of an existing position of the same feature in the former (subsequent) frame obtained here and the spatial coordinates of the input current focused pixel, a motion vector is obtained.

In the above explanation, the spatial coordinates of the focused pixel was stored respectively in addresses corresponding to the feature of the focused pixel and the feature in the vicinity of the feature of the focused pixel. However, by storing the spatial coordinates of the focused pixel and the spatial coordinates in the vicinity of the focused pixel at an address corresponding to the feature of the focused pixel, an idea of associating one spatial coordinates to a plurality of features may be also realized.

In the present embodiment, a memory device corresponding to motion vector detection was explained. Therefore, a memory device for storing spatial coordinates by using each feature as an address was taken as an example.

However, the present invention can be applied also to a system for performing matching other than motion vector detection. Namely, by using as an address a first feature indicating a feature A of data, it may be configured to store a second feature indicating a feature B of the data. The feature A and feature B may be suitably set or changed in accordance with an object of the system/device for performing matching. For example, in the present embodiment, an explanation was made assuming that the feature A was a pixel value pattern/ADRC code and the feature B was coordinates, but other features may be also used.

As explained above, according to the present embodiment, since a first feature extraction portion 13 for extracting a feature and spatial coordinates of a focused pixel from information of a current frame Fc as a focused frame from the first frame memory 11, and outputting the extracted feature as a signal S13a and the spatial coordinates of the focused pixel as a signal S13b; a second feature extraction portion 14 for extracting a feature, spatial coordinates of the focused pixel and the vicinity thereof and spatial distance information between the spatial coordinates and the focused pixel from information of a reference frame Fr of one frame before a focused frame, and outputting the extracted feature as a signal S14a, the spatial coordinates of the focused pixel and the vicinity of the focused pixel as a signal S14b and spatial distance information between the spatial coordinates and the focused pixel as a signal S14c; a database creation portion 15 for registering to a database linkage of the feature and spatial coordinates of the focused pixel and the vicinity thereof input as the signals S14a to S14c from the second feature extraction portion 14; and a motion vector detection portion 16 for obtaining a spatial coordinates information indicating at which point one having the same feature existed in a former (subsequent) frame from database information S15 of the database creation portion 15 by using the feature extracted in the first feature extraction portion 13 as an index, and obtaining a motion vector by obtaining relative relationship of an existing position of the same feature in the former (subsequent) frame obtained here and the spatial coordinates of the input current focused pixel; effects below can be obtained.

Namely, in the present embodiment, the spatial pattern information in a block area is regarded as a feature and distance calculation comparison is made only for the number of candidates, so that there is an advantage that highly accurate motion vector detection becomes possible with a smaller amount of calculation than that in a method of the related art.

INDUSTRIAL APPLICABILITY

According to an image processing apparatus and an image processing method of the present invention, highly accurate motion vector detection becomes possible, accordingly, it can be applied to processing requiring matching as in a motion detection device and an object search device, etc. used for a motion image compression apparatus, etc.

The invention claimed is:

1. An image processing apparatus for deriving a motion vector relative to a current frame and a preceding/subsequent frame of an image, comprising:
   a first feature extraction unit configured to extract from a current frame, an image feature used as an address, wherein a feature is a pixel value of a block having a focused pixel at the center of the block, said first feature extraction portion further configured to extract spatial coordinates of the focused pixel relative to the current frame, the extracted data of the first feature extracting unit defining first address data;
   a second feature extraction unit configured to extract from a preceding/subsequent frame, the same image feature, spatial coordinates of the focused pixel relative to the preceding/subsequent frame, and distance information relative to an area of the preceding/subsequent frame in the vicinity of the focused pixel, the extracted data of the second feature extracting unit defining second address data;
   a database, communicatively linked to the first and second feature extraction units for receiving the first and second address data, the database storing the spatial coordinates of the first and second data in association with multi-dimensional feature axes by storing spatial coordinates in two dimensional space in a buffer linked to a position of the spatial coordinates in three dimensional space within a feature space, the second data also being stored in association with the distance information; and
   a motion vector detector configured to derive the motion vector between the current frame and preceding/subsequent frame by obtaining the first address data from the database, using the first address data in the database as an index, and determining a reliability of the motion vector based upon the distance information of the second address information as it relates to the focused pixel of the image feature of the current frame.

2. The image processing apparatus of claim 1, wherein the image feature is a luminance vector.

3. The image processing apparatus of claim 2, wherein the vector includes at least two pixels.

4. The image processing apparatus of claim 1, wherein the multi-dimensional feature axes are Cartesian axes.

5. The image processing apparatus of claim 1, wherein the database is a semiconductor device.

6. An image processing method, carried out by an image processing apparatus, for deriving a motion vector relative to a current frame and a preceding/subsequent frame of an image, the image processing method comprising:
   extracting from a current frame using an image processing apparatus, an image feature used as an address, wherein a feature is a pixel value of a block having a focused pixel at the center of the block, said extracting step further includes extracting spatial coordinates of the focused pixel relative to the current frame, the extracted data of the first feature defining first address data;
   extracting from a preceding/subsequent frame using the image processing apparatus, the same image feature, spatial coordinates of the focused pixel relative to the preceding/subsequent frame, and distance information relative to an area of the preceding/subsequent frame in the vicinity of the focused pixel, the extracted data defining second address data;
   communicatively linking the first and second extracted features to a database for receiving the first and second address data, the database storing the spatial coordinates of the first and second data in association with multi dimensional feature axes by storing spatial coordinates in two dimensional space in a buffer linked to a position of the spatial coordinates in three dimensional space within a feature space, the second address data also being stored in association with the distance information; and
   configuring a motion vector between the current frame and preceding/subsequent frame using a motion vector detector by obtaining the first address data from the database, using the first address data in the database as an index, and determining a reliability of the motion vector based upon the distance information of the second address information as it relates to the focused pixel of the image feature of the current frame.

7. The image processing method of claim 6, wherein the image feature is a luminance vector.

8. The image processing method of claim 7, wherein the vector includes at least two pixels.

9. The image processing method of claim 6, wherein the multi-dimensional feature axes are Cartesian axes.

10. The image processing method of claims 6, wherein the database is stored in a semiconductor device.

11. An image processing apparatus for deriving a motion vector relative to a current frame and a preceding/subsequent frame of an image, comprising:
    a first feature extraction means for extracting from a current frame, an image feature used as an address, wherein a feature is a pixel value of a block having a focused pixel at the center of the block, said first feature extraction means additionally extracting spatial coordinates of the focused pixel relative to the current frame, the extracted data of the first feature extracting means defining first address data;
    a second feature extraction means for extracting from a preceding/subsequent frame, the same image feature, spatial coordinates of the focused pixel relative to the preceding/subsequent frame, and distance information relative to an area of the preceding/subsequent frame in the vicinity of the focused pixel, the extracted data of the second feature extracting means defining second address data;
    database means for communicatively linking the first and second feature extraction means for receiving the first and second address data, the database means storing the spatial coordinates of the first and second data in association with multi-dimensional feature axes by storing spatial coordinates in two dimensional space in a buffer linked to a position of the spatial coordinates in three dimensional space within a feature space, the second data also being stored in association with the distance information; and
    a motion vector detector means configured to derive the motion vector between the current frame and preceding/subsequent frame by obtaining the first address data from the database means, using the first address data in the database as an index, and determining a reliability of the motion vector based upon the distance information of the second address information as it relates to the focused pixel of the image feature of the current frame.

12. The image processing apparatus of claim 11, wherein the image feature is a luminance vector.

13. The image processing apparatus of claim 12, wherein the vector includes at least two pixels.

14. The image processing apparatus of claim 11, wherein the multi-dimensional feature axes are Cartesian axes.

15. The image processing apparatus of claim 11, wherein the database means is a semiconductor means.

* * * * *